United States Patent
Hu et al.

(10) Patent No.: US 11,977,700 B2
(45) Date of Patent: May 7, 2024

(54) ELECTRONIC DEVICE AND CONTROL METHOD THEREOF, TOUCH CONTROL SYSTEM, AND CHIP SYSTEM

(71) Applicant: HUAWEI TECHNOLOGIES CO., LTD., Shenzhen (CN)

(72) Inventors: Zhengyuan Hu, Xi'an (CN); Fengxin Wang, Xi'an (CN); Jian Shen, Hangzhou (CN); Nanxue Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/247,419

(22) PCT Filed: Sep. 14, 2021

(86) PCT No.: PCT/CN2021/118221
§ 371 (c)(1),
(2) Date: Mar. 30, 2023

(87) PCT Pub. No.: WO2022/068571
PCT Pub. Date: Apr. 7, 2022

(65) Prior Publication Data
US 2024/0019957 A1    Jan. 18, 2024

(30) Foreign Application Priority Data

Sep. 30, 2020    (CN) .......................... 202011069132.1

(51) Int. Cl.
*G06F 3/041* (2006.01)
*G06F 3/044* (2006.01)

(52) U.S. Cl.
CPC .......... *G06F 3/0416* (2013.01); *G06F 3/0446* (2019.05); *G06F 2203/04108* (2013.01)

(58) Field of Classification Search
None
See application file for complete search history.

(56) References Cited

U.S. PATENT DOCUMENTS

2016/0241139 A1*  8/2016  Yao .................. G06F 3/0412
2019/0025091 A1   1/2019  Wang

FOREIGN PATENT DOCUMENTS

EP    3637236 A1    4/2020
WO    2018201460 A1   11/2018

* cited by examiner

*Primary Examiner* — Stephen T. Reed
(74) *Attorney, Agent, or Firm* — Leydig, Voit & Mayer, Ltd.

(57) ABSTRACT

A touch detection drive circuit in an electronic device inputs a touch excitation signal to a touch electrode, and receives a detection signal of the touch electrode. An isolation power supply circuit: receives the touch excitation signal and a primary power supply voltage; based on the touch excitation signal in a non-touch detection phase, short-circuits a first reference ground and a second reference ground, stores the primary power supply voltage, and transmits the primary power supply voltage to the touch detection drive circuit; and in a touch detection phase, disconnects the first reference ground from the second reference ground and discharges to the touch detection drive circuit.

20 Claims, 18 Drawing Sheets

ELECTRONIC DEVICE AND CONTROL METHOD THEREOF, TOUCH CONTROL SYSTEM, AND CHIP SYSTEM

CROSS-REFERENCE TO RELATED APPLICATIONS

This application is a National Stage of International Application No. PCT/CN2021/118221, filed on Sep. 14, 2021, which claims priority to Chinese Patent Application No. 202011069132.1, filed on Sep. 30, 2020. Both of the aforementioned applications are hereby incorporated by reference in their entireties.

TECHNICAL FIELD

This application relates to the field of touch control technologies, and in particular, to an electronic device and a control method thereof, a touch control system, and a chip system.

BACKGROUND

When a touchscreen uses floating touch technologies, a finger of a user only needs to perform a hover, click, or slide operation above the touchscreen to perform a touch control operation on the electronic device, with no need to contact the touchscreen. Currently, a capacitive touch control detection technology may be used to implement a floating touch. In this case, an objective of touch control detection can be achieved by detecting a variation of a parasitic capacitance formed when the finger of the user is close to a touch control electrode in the touchscreen.

In a floating touch process, a larger distance between the finger of the user and the touch control electrode indicates a smaller capacitance formed between the finger of the user and the touch control electrode. Generally, the distance between the finger of the user and the touch control electrode needs to be less than or equal to a detection range applicable to the floating touch, for example, 5 mm. In this case, the variation of the capacitance can be effectively detected. When the distance between the finger of the user and the touch control electrode exceeds 5 mm, the excessively small capacitance causes excessively low precision of data obtained through touch control detection. As a result, the touch control detection cannot be implemented.

SUMMARY

This application provides an electronic device and a control method thereof, a touch control system, and a chip system, to increase a detection range suitable for a floating touch.

To achieve the foregoing objective, the following technical solutions are used in this application.

According to an aspect of this application, an electronic device is provided. The electronic device includes a touch control electrode, a touch control detection drive circuit, a first reference ground, a second reference ground, an isolation power supply circuit, and an alternating-current amplifier circuit. The touch control detection drive circuit is electrically connected to the touch control electrode and the second reference ground. The touch control detection drive circuit is configured to input a touch control excitation signal to the touch control electrode. The isolation power supply circuit is electrically connected to the touch control detection drive circuit, the first reference ground, the second reference ground, and a voltage source. The isolation power supply circuit is configured to: insulate the first reference ground from the second reference ground, and insulate the voltage source from the touch control detection drive circuit. In addition, the isolation power supply circuit is further configured to: receive a primary power supply voltage provided by the voltage source, convert the primary power supply voltage into a drive voltage of the touch control detection drive circuit, and couple the drive voltage to the touch control detection drive circuit through energy coupling. The alternating-current amplifier circuit is electrically connected to the second reference ground and the first reference ground. The alternating-current amplifier circuit is configured to: receive and amplify the touch control excitation signal to generate a voltage regulation signal, and transmit the voltage regulation signal to the second reference ground. A peak-to-peak value of the voltage regulation signal is greater than a voltage value of the first reference ground. In conclusion, in the foregoing electronic device, the isolation power supply circuit may convert the primary power supply voltage into the drive voltage of the touch control detection drive circuit. In addition, the touch control detection drive circuit that is grounded by using the second reference ground may output a touch control excitation signal after receiving the drive voltage output by the isolation power supply circuit. In addition, the isolation power supply circuit may insulate the first reference ground from the second reference ground, and insulate the voltage source from the touch control detection drive circuit. Therefore, the alternating-current amplifier circuit can boost a maximum voltage on the second reference ground, and the boosted voltage is greater than the voltage value of the first reference ground. In this case, in a touch control phase, when a finger performs a floating touch, an equivalent capacitor is formed between the finger equivalent to the first reference ground and the touch control electrode. A voltage difference between two electrode plates of the equivalent capacitor is relatively large. Therefore, an electrical signal used for detecting a charge/discharge time of the equivalent capacitor is amplified, thereby achieving an objective of increasing resolution of signal detection of the equivalent capacitor. In addition, a voltage difference between two electrode plates (the touch control electrode and the second reference ground) of a parasitic capacitor is relatively small. Therefore, a ratio of noise generated by the parasitic capacitor to a detection signal obtained by detecting a charge/discharge process of the equivalent capacitor is relatively small, to achieve an objective of improving a signal-to-noise ratio of touch control detection, thereby implementing the floating touch.

Optionally, the isolation power supply circuit includes a transformer, a resonant circuit, and a rectifier circuit. The transformer includes a primary-side winding and a secondary-side winding. The resonant circuit is electrically connected to the primary-side winding, the first reference ground, and the voltage source. The resonant circuit is configured to: convert a primary power supply voltage into an alternating current voltage, and transmit the alternating current voltage to the primary-side winding. The rectifier circuit is electrically connected to the secondary-side winding, the second reference ground, and the touch control detection drive circuit. The rectifier circuit is configured to convert an alternating current voltage generated through induction of the secondary-side winding into the drive voltage of the touch control detection drive circuit. In this way, the first reference ground and the second reference ground may be insulated through electromagnetic induction of the transformer. When the voltage source is insulated from the touch control detection drive circuit, power is supplied to the touch control detection drive circuit that is grounded by using the second reference ground.

Optionally, the isolation power supply circuit includes a capacitor. The capacitor includes at least two plates. One of the at least two plates is electrically connected to the first reference ground and the voltage source, and the other one of the at least two plates is electrically connected to the second reference ground and the touch control detection drive circuit. In this way, the first reference ground and the second reference ground may be insulated through a coupling effect of a capacitor. When the voltage source is insulated from the touch control detection drive circuit, power is supplied to the touch control detection drive circuit that is grounded by using the second reference ground.

Optionally, the electronic device further includes a first isolation element. The first isolation element is coupled between the touch control detection drive circuit and the alternating-current amplifier circuit. The first isolation element is configured to couple the touch control excitation signal to the alternating-current amplifier circuit. The touch control detection circuit is electrically connected to the second reference ground, and the alternating-current amplifier circuit is electrically connected to the first reference ground. In this way, by using the first isolation element, signal transmission can be implemented between circuits electrically connected to different reference grounds.

Optionally, the first isolation element includes a light emitting device and an optical-to-electrical converter. The light emitting device is electrically connected to the touch control detection drive circuit, and is configured to convert a touch control excitation signal from the touch control detection drive circuit into an optical signal. The optical-to-electrical converter is electrically connected to the alternating-current amplifier circuit, and is configured to: convert the optical signal into an electrical signal, and transmit the electrical signal to the alternating-current amplifier circuit. In this case, the first isolation element performs coupling transmission of a signal in an optical coupling manner.

Optionally, the first isolation element includes a signal input interface, a signal output interface, and an isolation capacitor. The signal input interface is electrically connected to the touch control detection drive circuit, and is configured to receive the touch control excitation signal from the touch control detection drive circuit. The signal output interface is electrically connected to the alternating-current amplifier circuit. A first end of the isolation capacitor is electrically connected to the signal input interface, and a second end of the isolation capacitor is electrically connected to the signal output interface. The isolation capacitor is configured to transmit the touch control excitation signal from the signal input interface to the signal output interface. In this case, the first isolation element performs coupling transmission of a signal in a capacitive coupling manner.

Optionally, the first isolation element includes a sounding device and an electroacoustic transducer. The sounding device is electrically connected to the touch control detection drive circuit, and is configured to convert a touch control excitation signal from the touch control detection drive circuit into a sound signal. The electroacoustic transducer is electrically connected to the alternating-current amplifier circuit, and is configured to: convert the sound signal into an electrical signal, and transmit the electrical signal to the alternating-current amplifier circuit. In this case, the first isolation element performs coupling transmission of a signal in a sound coupling manner.

Optionally, the alternating-current amplifier circuit includes an operational amplifier, a first capacitor, a first resistor, a second capacitor, and a second resistor. An output end of the operational amplifier is electrically connected to the second reference ground, and a control end is electrically connected to a control voltage end. A first end of the first capacitor is electrically connected to the touch control detection drive circuit, and a second end of the first capacitor is electrically connected to a positive input end of the operational amplifier. A first end of the first resistor is electrically connected to a negative input end of the operational amplifier. A first end of the second capacitor is electrically connected to a second end of the first resistor, and a second end of the second capacitor is electrically connected to the first reference ground. A first end of the second resistor is electrically connected to the negative input end of the operational amplifier, and a second end of the second resistor is electrically connected to the output end of the operational amplifier. In this way, the first resistor (with a resistance value of R1), the second resistor (with a resistance value of R2), and the second capacitor may form an alternating-current amplifier unit. The alternating-current amplifier unit can amplify a peak-to-peak value of a voltage of the touch control excitation signal transmitted to the positive input end of the operational amplifier by using the first capacitor by R2/R1 times, so that the peak-to-peak value of the voltage at the output end of the operational amplifier can be close to a full scale of the operational amplifier (that is, a voltage value of the control voltage end). In this way, a voltage of the second reference ground can be boosted.

Optionally, the alternating-current amplifier circuit further includes a third resistor and a fourth resistor. A first end of the third resistor is electrically connected to the control voltage end, and a second end of the third resistor is electrically connected to the positive input end of the operational amplifier. A first end of the fourth resistor is electrically connected to the positive input end of the operational amplifier, and a second end of the fourth resistor is electrically connected to the first reference ground. The third resistor and the fourth resistor have a same resistance value. Under a voltage division function of the third resistor and the fourth resistor, a central bias voltage may be generated at a central bias point. In this way, the first resistor, the second resistor, and the second capacitor form an alternating-current amplifier unit, to stably amplify a peak-to-peak value of a voltage of the touch control excitation signal.

Optionally, the electronic device further includes a processor and a second isolation element. The processor is electrically connected to the first reference ground. The second isolation element is coupled between the processor and the touch control detection drive circuit. The second isolation element is configured to: couple a control signal output by the processor to the touch control detection drive circuit, and couple a touch control detection result obtained by the touch control detection drive circuit to the processor. The processor is electrically connected to the first reference ground. The touch control detection drive circuit is electrically connected to the second reference ground. In this way, by using the second isolation element, signal transmission can be implemented between circuits electrically connected to different reference grounds.

Optionally, the electronic device further includes a battery and a first PMU. The first PMU is electrically connected to the battery and the isolation power supply circuit. The first PMU is configured to: convert a battery voltage of the battery into a primary power supply voltage, and transmit the primary power supply voltage to the isolation power supply circuit. The battery and the first PMU may form a power supply configured to provide the foregoing primary power supply voltage.

Optionally, the electronic device further includes a first circuit board and a second circuit board. The second reference ground is disposed in the first circuit board, and the touch control detection drive circuit is disposed on the first circuit board. The first reference ground is disposed in the second circuit board, and the isolation power supply circuit and the alternating-current amplifier circuit are disposed on the second circuit board. In this way, the first circuit board and the second circuit board are disposed, so that the touch control detection drive circuit, the isolation power supply circuit, and the alternating-current amplifier circuit can be connected to reference grounds in different circuit boards.

Optionally, the electronic device further includes a first circuit board and a second circuit board. The second reference ground is disposed in the first circuit board, and the touch control detection drive circuit and the isolation power supply circuit are disposed on the first circuit board. The first reference ground is disposed in the second circuit board, and the alternating-current amplifier circuit is disposed on the second circuit board. In this way, the first circuit board and the second circuit board are disposed, so that the touch control detection drive circuit, the isolation power supply circuit, and the alternating-current amplifier circuit can be connected to reference grounds in different circuit boards.

Optionally, the touch control electrode is a self-capacitance electrode. The electronic device further includes a cover. The cover and the first circuit board are disposed in a stacked manner. The first circuit board includes first copper foil close to the cover. The first copper foil includes a plurality of self-capacitance electrodes. The self-capacitance electrode is connected to the cover. The touch control detection drive circuit is disposed on a surface on a side that is of the first circuit board and that is away from the cover. In this way, a layer of the first copper foil that is in the first circuit board and that is closest to the cover is multiplexed as the self-capacitance electrode. Therefore, there is no need to add a conductive layer for manufacturing the self-capacitance electrode, thereby achieving an objective of simplifying a product structure. In this case, the electronic device may be a touchpad without a display function. The touchpad uses a self-capacitance touch control manner.

Optionally, the touch control electrode is a self-capacitance electrode. The electronic device further includes a cover and a first display screen, and the self-capacitance electrode is located between the cover and the first display screen. A material of the self-capacitance electrode includes a transparent conductive material. In this case, the electronic device may have a display function. The electronic device uses a self-capacitance touch control manner.

Optionally, the touch control detection drive circuit includes a drive detection end, and each touch control electrode is electrically connected to the drive detection end. The drive detection end is configured to: send the touch control excitation signal to the touch control electrode, and receive a detection signal of the touch control electrode. In this way, by using the plurality of block-shaped touch control electrodes disposed at intervals, self-capacitance touch control can be implemented.

Optionally, there are a plurality of touch control electrodes. The plurality of touch control electrodes include a plurality of transmitting electrodes and a plurality of receiving electrodes, and the plurality of transmitting electrodes and the plurality of receiving electrodes intersect and are insulated. The electronic device further includes a cover. The cover and the first circuit board are disposed in a stacked manner. The first circuit board includes first copper foil and second copper foil that are stacked and insulated. The first copper foil includes a plurality of transmitting electrodes. The second copper foil includes a plurality of receiving electrodes. The transmitting electrode or the receiving electrode is connected to the cover. The touch control detection drive circuit is disposed on a surface on a side that is of the first circuit board and that is away from the cover. In this way, the first copper foil in the first circuit board is multiplexed as the transmitting electrode, and the second copper foil is multiplexed as the receiving electrode. Therefore, there is no need to add an additional conductive layer for manufacturing a conductive layer of the touch control electrode, thereby achieving an objective of simplifying a product structure. In this case, the electronic device may be a touchpad without a display function. The touchpad uses a mutual capacitance touch control manner.

Optionally, there are a plurality of touch control electrodes. The plurality of touch control electrodes include a plurality of transmitting electrodes and a plurality of receiving electrodes, and the plurality of transmitting electrodes and the plurality of receiving electrodes intersect and are insulated. The electronic device further includes a cover and a first display screen, and the transmitting electrode and the receiving electrode are located between the cover and the first display screen. In this case, the electronic device may have a display function. The electronic device uses a mutual capacitance touch control manner.

Optionally, the touch control detection drive circuit includes a drive end and a detection end. Each transmitting electrode is electrically connected to the drive end. The drive end is configured to send a touch control excitation signal to the transmitting electrode. Each receiving electrode is electrically connected to the detection end. The detection end is configured to receive a detection signal of the electrode. In this way, by using the plurality of transmitting electrodes and the plurality of receiving electrodes, the mutual capacitance touch control can be implemented.

Optionally, the second circuit board and the first circuit board are disposed in a stacked manner, and are located on a side that is of the first circuit board and that is away from the cover. In this way, the first circuit board and the second circuit board are disposed, so that the touch control detection drive circuit and another control circuit (for example, the processor, the isolation power supply circuit, and the alternating-current amplifier circuit) in the electronic device can be disposed on different circuit boards. In this case, in a process of attaching the first circuit board to the cover by using a large quantity of double-sided adhesive tapes, a fault of the foregoing another control circuit can be avoided in the attaching process, and the touch control detection drive circuit on the first circuit board can be tested. In addition, there are usually a relatively large quantity of touch control electrodes in the electronic device, so that there are also a relatively large quantity of signal lines used for electrically connecting the touch control electrodes and the touch control detection drive circuit. Therefore, the touch control detection drive circuit and the touch control electrodes need to be disposed on a same circuit board, to facilitate connection of the foregoing signal lines.

According to another aspect of this application, a touch control system is provided. The touch control system may include a second display screen and any one of the electronic devices described above. The second display screen is communicatively connected to the electronic device. The touch control system has a same technical effect as the electronic device provided in the foregoing embodiment. Details are not described herein again.

According to another aspect of this application, a control method of an electronic device is provided. The electronic device includes a plurality of touch control electrodes, a touch control detection drive circuit, an isolation power supply circuit, an alternating-current amplifier circuit, a first reference ground, and a second reference ground. The touch control detection drive circuit is electrically connected to the touch control electrode and the second reference ground. The isolation power supply circuit is electrically connected to the touch control detection drive circuit, the first reference ground, the second reference ground, and a voltage source. The alternating-current amplifier circuit is electrically connected to the second reference ground and the first reference ground. The foregoing control method includes: The isolation power supply circuit insulates the first reference ground from the second reference ground, and insulates the voltage source from the touch control detection drive circuit. The isolation power supply circuit converts a primary power supply voltage into a drive voltage of the touch control detection drive circuit, and couples the drive voltage of the touch control detection drive circuit to the touch control detection drive circuit through energy coupling. The touch control detection drive circuit inputs a touch control excitation signal to the touch control electrode. The alternating-current amplifier circuit receives and amplifies the touch control excitation signal to generate a voltage regulation signal, and transmits the voltage regulation signal to the second reference ground. A peak-to-peak value of the voltage regulation signal is greater than a voltage value of the first reference ground. The foregoing control method has a same technical effect as the electronic device provided in the foregoing embodiment. Details are not described herein again.

According to another aspect of this application, a floating touch module is provided. The floating touch module is configured to: when there is a specific distance between a finger and a touch control electrode, detect a variation of a capacitance formed between the finger and the touch control electrode. The floating touch module may include a chip system. The chip system may be a structure obtained after a single bare chip is packaged. Alternatively, the chip system may be a structure formed after a plurality of bare chips are packaged. The chip system may include a first reference ground, a second reference ground, a touch control detection drive module, an isolation power supply module, and an alternating-current amplifier module. The touch control detection drive module is electrically connected to the touch control electrode and the second reference ground, and is configured to input a touch control excitation signal to the touch control electrode. The isolation power supply module is electrically connected to the touch control detection drive module, the first reference ground, the second reference ground, and the voltage source. The isolation power supply module is configured to: insulate the first reference ground from the second reference ground, insulate the voltage source from the touch control detection drive module, receive a primary power supply voltage provided by the voltage source, convert the primary power supply voltage into a drive voltage of the touch control detection drive module, and couple the drive voltage to the touch control detection drive module through energy coupling. The alternating-current amplifier module is electrically connected to the second reference ground and the first reference ground. The alternating-current amplifier module is configured to: receive and amplify the touch control excitation signal to generate a voltage regulation signal, and transmit the voltage regulation signal to the second reference ground. A peak-to-peak value of the voltage regulation signal is greater than a voltage value of the first reference ground. The foregoing chip system has a same technical effect as the electronic device provided in the foregoing embodiment. Details are not described herein again.

REFERENCE NUMERALS

Figure 1:
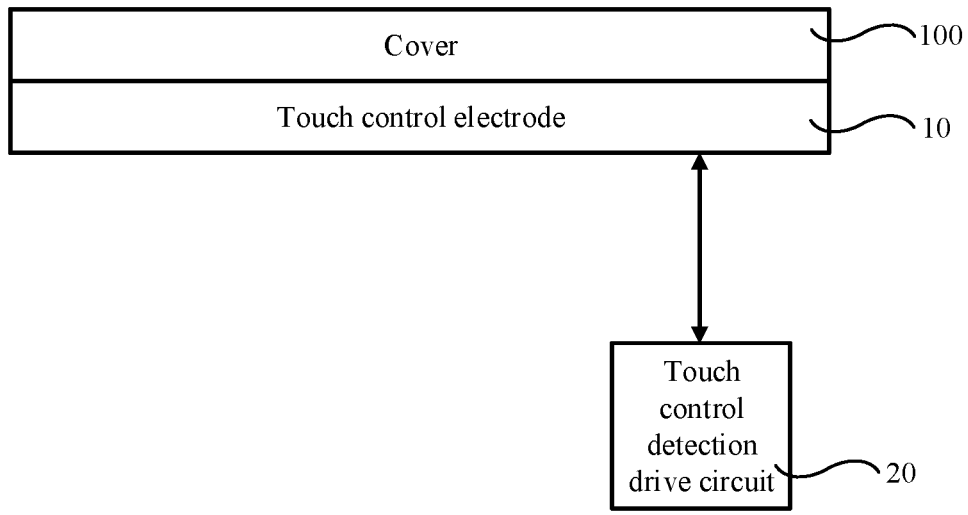
FIG. 1 is a schematic diagram of a structure of an electronic device according to an embodiment of this application.

01. Electronic device
10. Touch control electrode
20. Touch control detection drive circuit
100. Cover
02. First display screen
11. Self-capacitance electrode
12. Touch control lead
201. Drive detection end
210. Excitation generation unit
221. Capacitance detection unit
202. Drive end
203. Detection end
TX. Transmitting electrode
RX. Receiving electrode
110. Block-shaped electrode
112. Strip-shaped electrode
30. Isolation power supply circuit
40. Alternating-current amplifier circuit
51. First isolation element
60. Battery
61. First PMU
350. Transformer
361. Primary-side winding
362. Secondary-side winding
351. Resonant circuit
352. Rectifier circuit
62. Second PMU
401. Operational amplifier
70. Processor
501. Light emitting device
502. Optical-to-electrical converter
503. Signal input interface
504. Isolation capacitor
505. Signal output interface
506. Sounding device
507. Electroacoustic transducer
52. Second isolation element
101. First circuit board
102. Second circuit board
111. First copper foil
222. Second copper foil
81. First transmission element
82. Second transmission element
83. Display end processor
04. Second display screen
90. Cursor

DESCRIPTION OF EMBODIMENTS

The following describes the technical solutions in the embodiments of this application with reference to the accompanying drawings in the embodiments of this application. It is clear that the described embodiments are merely a part rather than all of the embodiments of this application.

In the following, the terms "first", "second", and the like are used merely for descriptive purposes, and shall not be understood as an indication or implication of relative importance or implicit indication of the number of indicated technical features. Therefore, a feature limited by "first", "second", or the like may explicitly or implicitly include one or more features.

In addition, in this application, orientation terms such as "left", "right", "up", and "down" are defined relative to orientations of schematic placement of components in the accompanying drawings. It should be understood that these directional terms are relative concepts that are used for relative description and clarification and may correspondingly change according to a change in an orientation in which a component is placed in the accompanying drawings.

In this application, unless otherwise specified and defined explicitly, the term "electrical connection" should be understood in their general senses. For example, the "electrical connection" may be a direct electrical connection, or may be an indirect electrical connection through an intermediate medium.

An embodiment of this application provides an electronic device. The electronic device may include electronic products with a touch control function, such as a touchpad, a mobile phone, a tablet computer (pad), a television, and an intelligent wearable product (for example, a smartwatch or a smart band). A specific form of the foregoing electronic device is not limited in the embodiments of this application.

When an electronic device 01 has a touch control function, as shown in FIG. 1, the electronic device 01 may include a touch control electrode 10, a cover 100 covering the touch control electrode 10, and a touch control detection drive circuit 20 electrically connected to the touch control electrode 10. The touch control detection drive circuit 20 is configured to: input a touch control excitation signal to the touch control electrode 10, and receive a detection signal of the touch control electrode 10, to implement touch control detection.

It should be noted that the cover 100 may be a substrate made of glass, polyethylene terephthalate (PET), or polycarbonate (PC). The cover 100 may be transparent (for example, a light transmittance may reach more than 85%), or may be totally opaque.

Figure 2A:
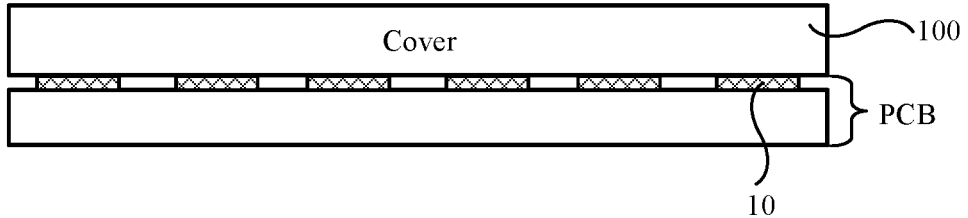
FIG. 2A is a schematic diagram of a disposing manner of a touch control electrode according to an embodiment of this application.

In some embodiments of this application, the electronic device 01 may be a touchpad without a display function. In this case, the electronic device 01 may be provided with a printed circuit board (PCB) shown in FIG. 2A. The PCB and the cover 100 may be disposed in a stacked manner. The cover 100 may be totally opaque. In this case, a metal layer that is in the PCB and that is close to the cover 100 may be manufactured into the touch control electrode 10.

Figure 2B:
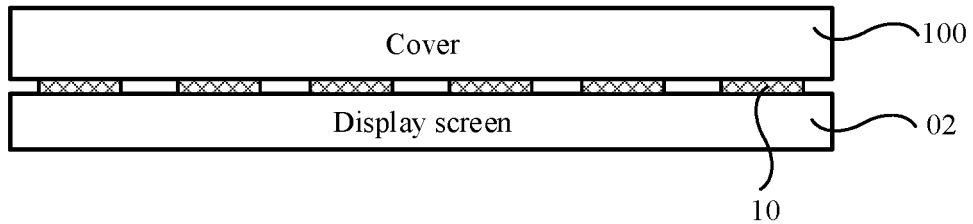
FIG. 2B is a schematic diagram of another disposing manner of a touch control electrode according to an embodiment of this application.

Alternatively, in some other embodiments of this application, when the electronic device 01 has the display function, as shown in FIG. 2B, the electronic device 01 may include a first display screen 02, the cover 100, and the touch control electrode 10 located between an out-light surface (a surface used for displaying an image) of the first display screen 02 and the cover 100. The first display screen 02 may be a first liquid crystal display (LCD), or may be a first display screen of an organic light emitting diode (OLED) that can implement self-luminance. In addition, a material of the touch control electrode 10 may include a transparent conductive material, for example, indium tin oxide (ITO) or indium zinc oxide (IZO).

Figure 3:
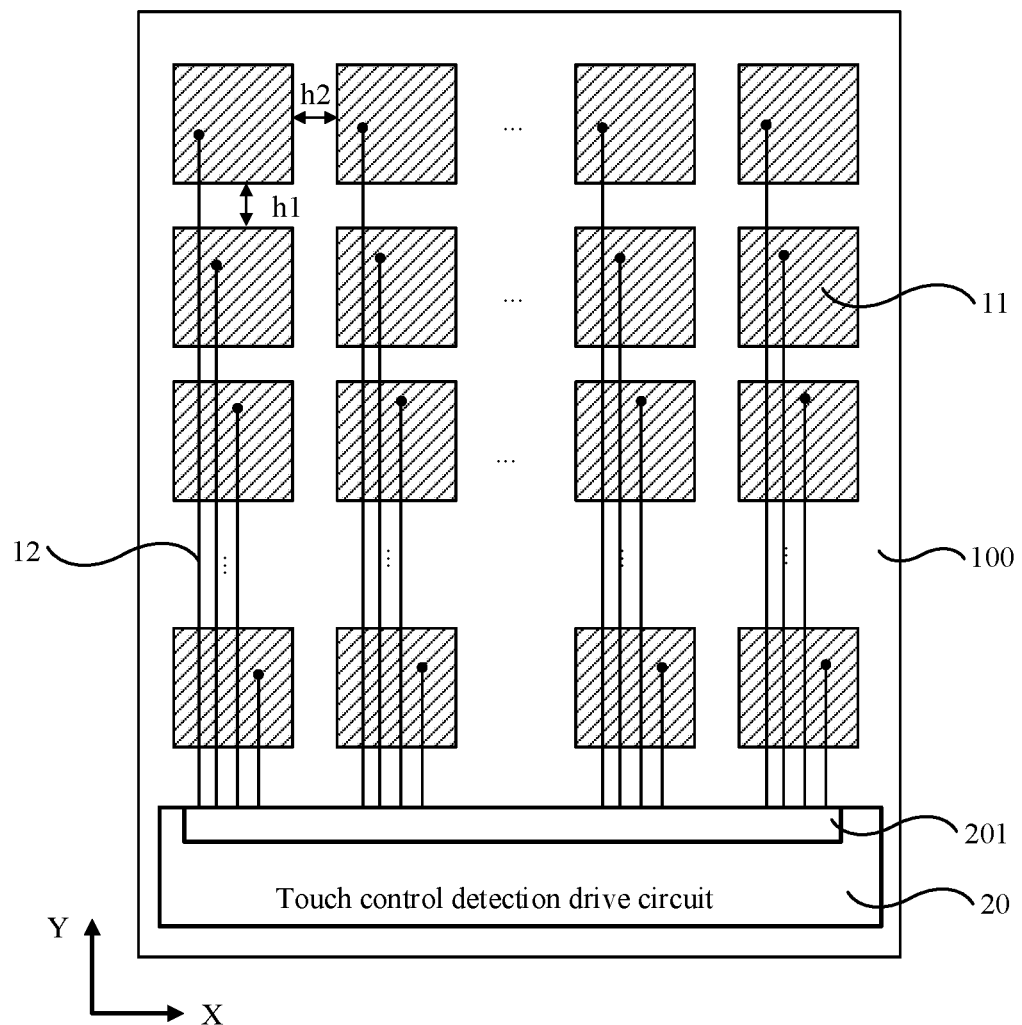
FIG. 3 is a schematic diagram of another disposing manner of a touch control electrode according to an embodiment of this application.

The electronic device 01 usually includes a plurality of touch control electrodes 10. For example, in some embodiments of this application, the electronic device 01 may use a self-capacitance touch control technology. In this case, the plurality of touch control electrodes 10 may be a plurality of block-shaped self-capacitance electrodes 11 shown in FIG. 3. The plurality of self-capacitance electrodes 11 may be disposed at intervals of a specific preset distance h1 in a first direction Y. In addition, the plurality of self-capacitance electrodes 11 may be further disposed at intervals of a specific preset distance h2 in a second direction X. In this way, the plurality of self-capacitance electrodes 11 may be formed by using the same conductive layer. The plurality of self-capacitance electrodes 11 are not connected to each other, so that the plurality of self-capacitance electrodes 11 can be insulated from each other. The first direction X and the second direction Y may intersect. On this basis, as shown in FIG. 3, the touch control detection drive circuit 20 may include a drive detection end 201, and each self-capacitance electrode 11 may be electrically connected to the drive detection end 201 of the touch control detection drive circuit 20 through one touch control lead 12.

Figure 4A:
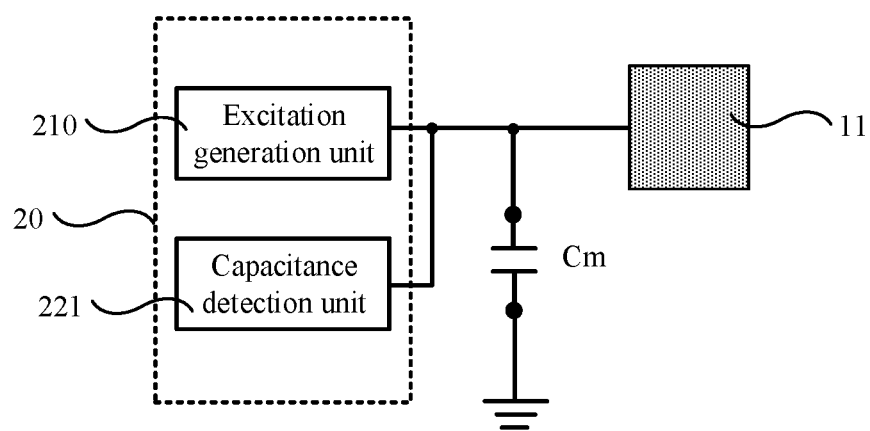
FIG. 4A is a schematic diagram of a touch control state of the touch control electrode shown in FIG. 3.
Figure 5:
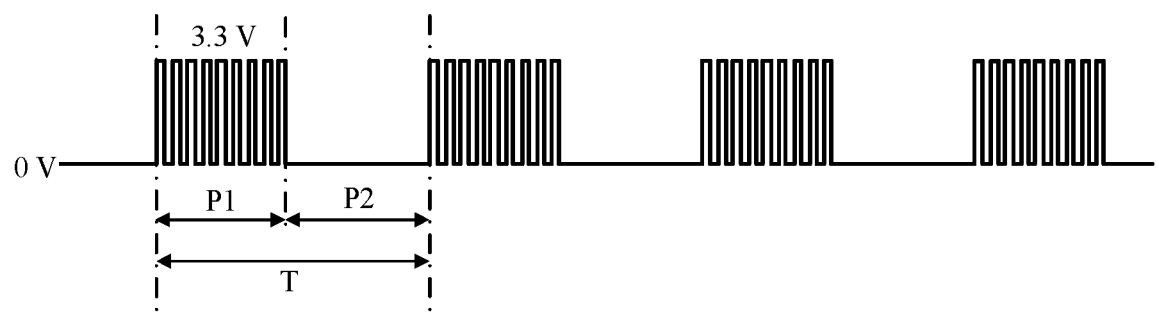
FIG. 5 is a waveform diagram of a touch control excitation signal according to an embodiment of this application.

In this case, to implement touch control detection, the touch control detection drive circuit 20 may include an excitation generation unit 210 and a capacitance detection unit 221 shown in FIG. 4A. The excitation generation unit 210 may send a touch control excitation signal S1 to the self-capacitance electrode 11 in a sampling period T by using the drive detection end 201. As shown in FIG. 5, the touch control excitation signal S1 may be a square wave signal.

For example, the touch control excitation signal S1 may be a square wave signal with a sampling frequency of 120 Hz (that is, 120 times of sampling per second). In each sampling period T, a scanning frequency of the touch control excitation signal S1 is greater than 100 kHz (for example, 300 kHz). Each sampling period T may include a touch control phase P1 and a non-touch control phase P2. In the touch control phase P1 (a region in which square waves are relatively dense in FIG. 5), the touch control excitation signal S1 may be used to scan all the self-capacitance electrodes 11 in the electronic device 01 at least once at a scanning frequency greater than 100 kHz (for example, 300 kHz). In the non-touch control phase P1, the touch control excitation signal S1 is always at a low level. In addition, a peak-to-peak value of the excitation signal S1 may be 3.3 V.

At the same time, as shown in FIG. 4A, there is a relatively small parasitic capacitor Cm between the self-capacitance electrode 11 and the reference ground (for example, GND). In a process of scanning the self-capacitance electrode 11, the capacitance detection unit 221 in the touch control detection drive circuit 20 detects a charge/discharge time of the parasitic capacitor Cm in each touch control phase P1 by using the drive detection end 201. When the finger is not close to the self-capacitance electrode 11, in the touch control phase P1, the charge-discharge time of the parasitic capacitor Cm is a constant. For example, when the touch control detection drive circuit 20 provides, for the self-capacitance electrode 11, the touch control excitation signal S1 whose peak-to-peak value is 3.3 V, a voltage difference between a positive plate and a negative plate of the parasitic capacitor Cm is about 3.3 V.

Figure 4B:
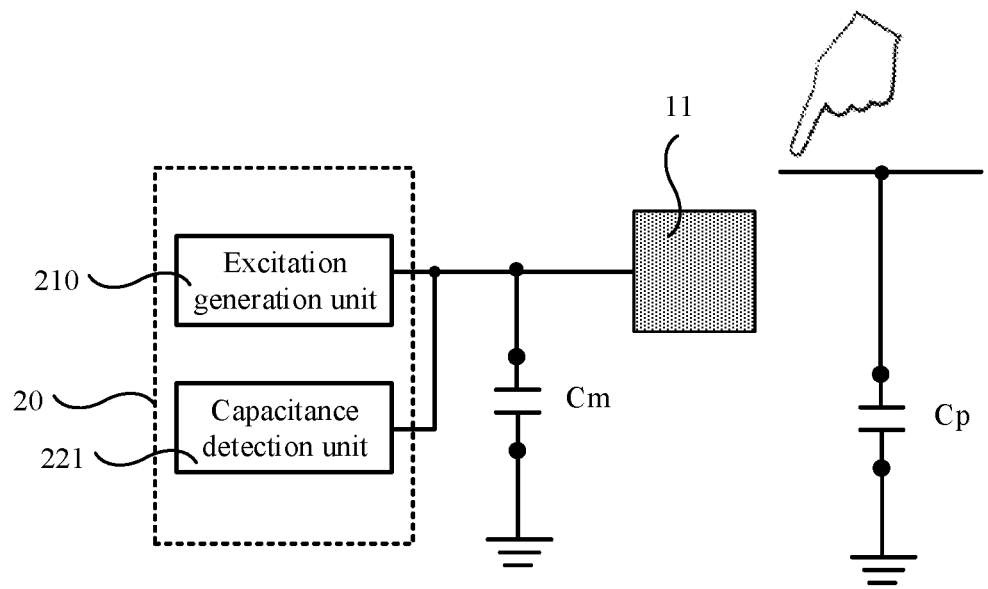
FIG. 4B is a schematic diagram of a touch control state of the touch control electrode shown in FIG. 3.

When the finger is close to the self-capacitance electrode 11, as shown in FIG. 4B, the finger may be equivalent to the reference ground (for example, 0 V), and an equivalent capacitor Cp is formed between the finger and the self-capacitance electrode 11. When the touch control detection drive circuit 20 provides, for the self-capacitance electrode 11, the touch control excitation signal S1 whose peak-to-peak value is 3.3 V, a voltage difference between a positive plate and a negative plate of the equivalent capacitor Cp is about 3.3 V. In this case, in the touch control phase P1, the touch control detection drive circuit 20 needs to detect charge/discharge times of both the parasitic capacitor Cm and the equivalent capacitor Cp. Therefore, the charge/discharge time that is of the capacitor and that is detected by the touch control detection drive circuit 20 is greatly prolonged. The touch control detection drive circuit 20 may calculate a magnitude of the equivalent capacitor Cp based on a detected actual charge/discharge time and a charge/discharge time of the parasitic capacitor Cm as a constant, to achieve an objective of touch control detection.

Alternatively, for another example, the electronic device 01 may use a mutual capacitance touch control technology. In this case, the plurality of touch control electrodes 10 may include a plurality of transmitting electrodes TX and a plurality of receiving electrodes RX shown in FIG. 6A, and the plurality of transmitting electrodes TX and the plurality of receiving electrodes RX intersect and are insulated. In addition, each of the plurality of transmitting electrodes TX may extend in the first direction Y, and the plurality of transmitting electrodes TX may be disposed side by side in the second direction X at intervals of a specific preset distance h3. Each of the plurality of receiving electrodes RX may extend in the second direction X, and the plurality of receiving electrodes RX may be disposed side by side in the first direction Y at intervals of a specific preset distance h4, so that the plurality of transmitting electrodes TX and the plurality of receiving electrodes RX can intersect. In addition, the transmitting electrodes TX and the receiving electrodes RX may be formed by using two different conductive layers, and the two conductive layers are insulated by using an insulation layer. In this case, the touch control detection drive circuit 20 may include a drive end 202 and a detection end 203. Each transmitting electrode TX may be electrically connected to the drive end 202. Each receiving electrode RX is electrically connected to the detection end 203.

Figure 6A:
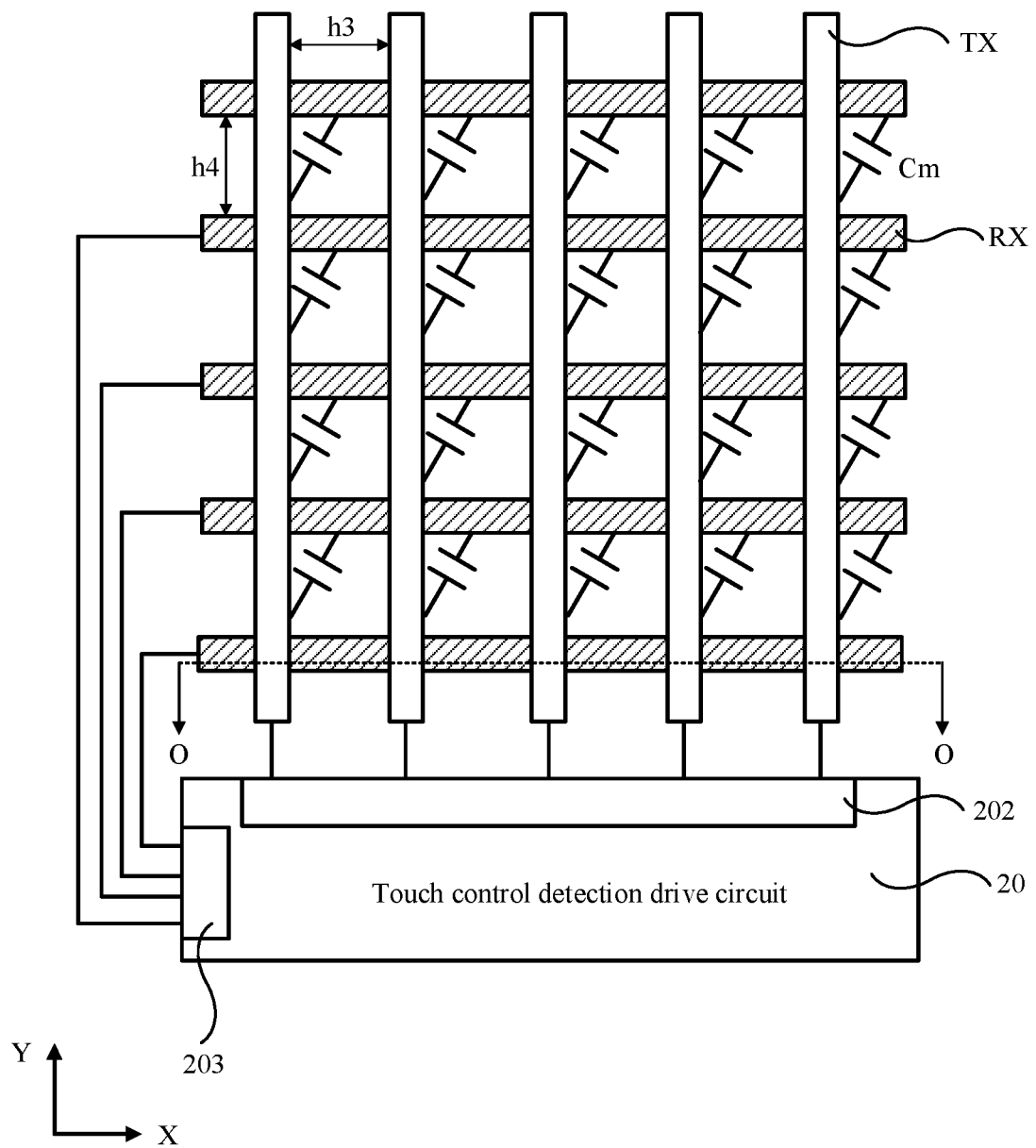
FIG. 6A is a schematic diagram of another disposing manner of a touch control electrode according to an embodiment of this application.
Figure 6B:
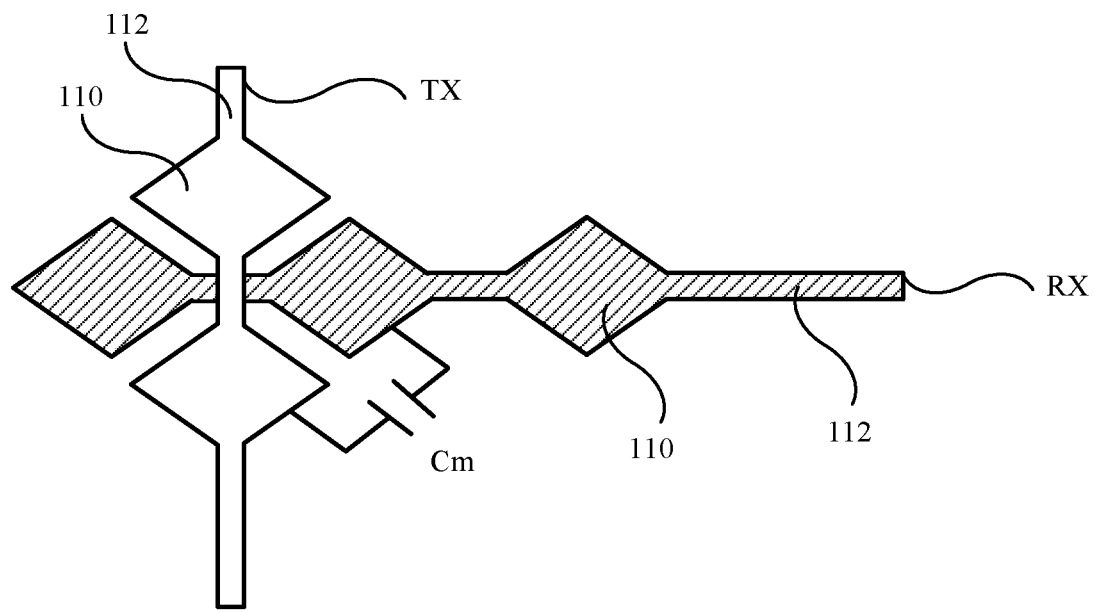
FIG. 6B is a schematic diagram of a specific structure of a transmitting electrode and a receiving electrode in FIG. 6A.

As shown in FIG. 6B, any one of the transmitting electrode TX and the receiving electrode RX may include a plurality of block-shaped electrodes 110 and strip-shaped electrodes 112 connected to the plurality of block-shaped electrodes 110. At an intersection location of the strip-shaped electrode 112 of the transmitting electrode TX and the strip-shaped electrode of the receiving electrode RX, a parasitic capacitor Cm may be formed between one block-shaped electrode 110 of the transmitting electrode TX and one block-shaped electrode 110 of the receiving electrode RX. Therefore, any intersecting group of the transmitting electrode TX and the receiving electrode RX shown in FIG. 6A has the parasitic capacitor Cm at an intersection location.

In this case, to implement touch control detection, the touch control detection drive circuit 20 may send the touch control excitation signal S1 (as shown in FIG. 5) to the transmitting electrode TX by using the drive end 202 shown in FIG. 6A, to charge the parasitic capacitor Cm. In addition, in a process of scanning the transmitting electrode TX, the touch control detection drive circuit 20 further detects a detection signal of the receiving electrode RX by using the detection end 203, to determine a discharge time of the parasitic capacitor Cm in each touch control phase P1 and obtain a capacitance value of Cm.

Figure 6C:
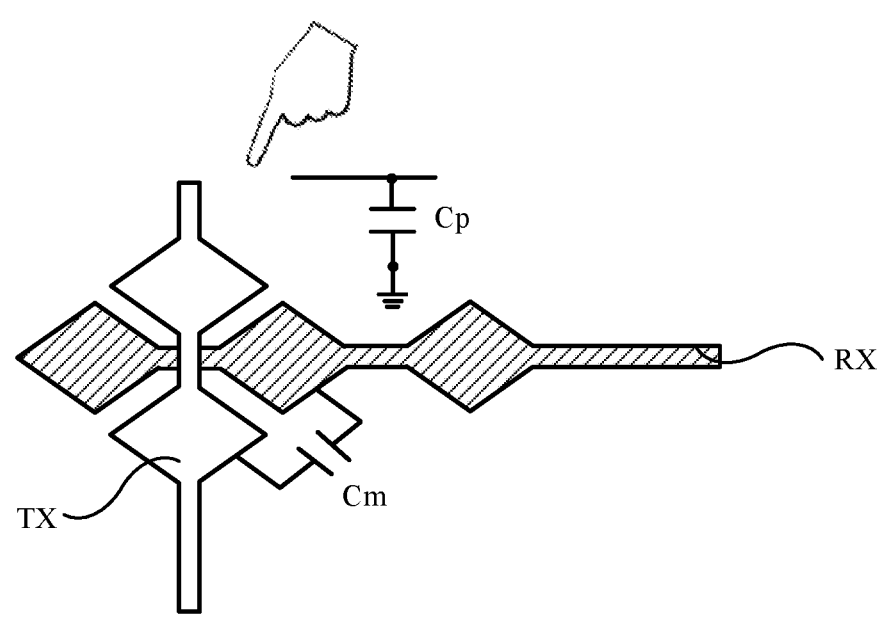
FIG. 6C is a schematic diagram of a touch control state of a touch control electrode shown in FIG. 6B.

Similarly, when the finger is not close to the transmitting electrode TX and the receiving electrode RX, the parasitic capacitor Cm is a constant. When the finger is close to the transmitting electrode TX and the receiving electrode RX, it can be learned from the foregoing that the finger may be equivalent to the reference ground (for example, 0 V), and an equivalent capacitor Cp is formed between the finger and the transmitting electrode TX. Therefore, as shown in FIG. 6C, it is equivalent to a case in which an equivalent capacitor Cp is connected in parallel at two ends of the parasitic capacitor Cm. In this way, when the touch control detection drive circuit 20 detects an increase of the capacitance value, it may be determined that the finger performs a touch, thereby achieving an objective of touch control detection.

It can be learned from the foregoing that, for any one of the self-capacitance touch control manner and the mutual capacitance touch control manner, when the finger of the user is close to the touch control electrode, the equivalent capacitor Cp is generated. The touch control detection drive circuit 20 can detect a charge/discharge time of a capacitor in the touch control phase P1 to obtain the magnitude of the equivalent capacitor Cp, thereby implementing the touch control detection. In a process in which the touch control detection drive circuit 20 measures the equivalent capacitor Cp, detection of the charge/discharge process of the parasitic capacitor Cm becomes noise, thereby affecting measurement precision for the equivalent capacitor Cp. In addition, the capacitance value of the equivalent capacitor Cp is larger when the finger is closer to the touch control electrode, and the capacitance value of the equivalent capacitor Cp is smaller when the finger is farther away from the touch control electrode. As a result, when the finger is away from the touch control electrode to perform a floating touch, precision of touch control detection is further reduced.

Figure 7:
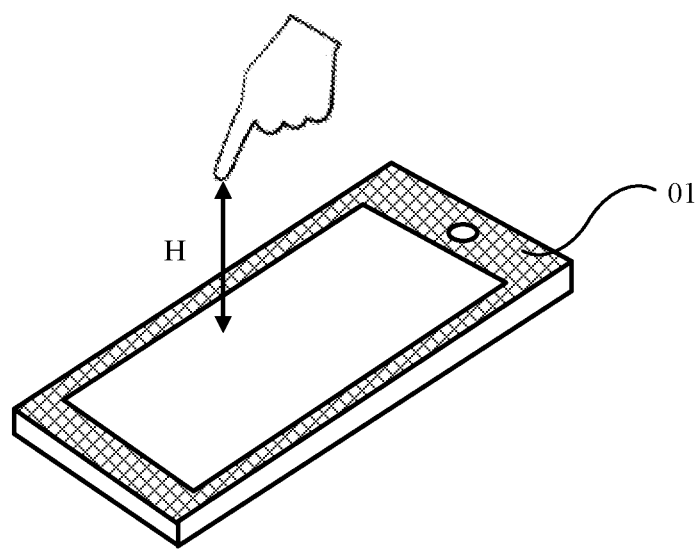
FIG. 7 is a schematic diagram of a floating touch according to an embodiment of this application.

In this case, in this embodiment of this application, resolution and a signal-to-noise ratio of signal detection of the equivalent capacitor Cp may be improved. Therefore, as shown in FIG. 7, when a distance H between the finger and the touch control electrode of the electronic device 01 is relatively long (for example, H≥20 mm), the charge/discharge time of the equivalent capacitor Cp can also be accurately detected, thereby achieving an objective of a floating touch.

The following uses an example in which the touch control electrode 10 is the foregoing self-capacitance electrode. To improve a signal detection range and a signal-to-noise ratio of the equivalent capacitor Cp, the electronic device provided in this embodiment of this application may include a first reference ground GND1 (for example, 0 V) and a second reference ground GND2 (for example, a peak-to-peak voltage value may be about 20 V) shown in FIG. 8. The parasitic capacitor Cm is formed between the touch control electrode 10 and the second reference ground GND2. In this case, the touch control electrode 10 and the second reference ground GND2 (20 V) may be respectively used as a positive plate and a negative plate of the parasitic capacitor Cm. When the touch control detection drive circuit 20 provides, for the touch control electrode 10, the touch control excitation signal S1 whose peak-to-peak value is 3.3 V, a voltage of the touch control electrode 10 is 23.3 V, and a voltage difference between the positive plate and the negative plate of the parasitic capacitor Cm is about 3.3 V.

Figure 8:
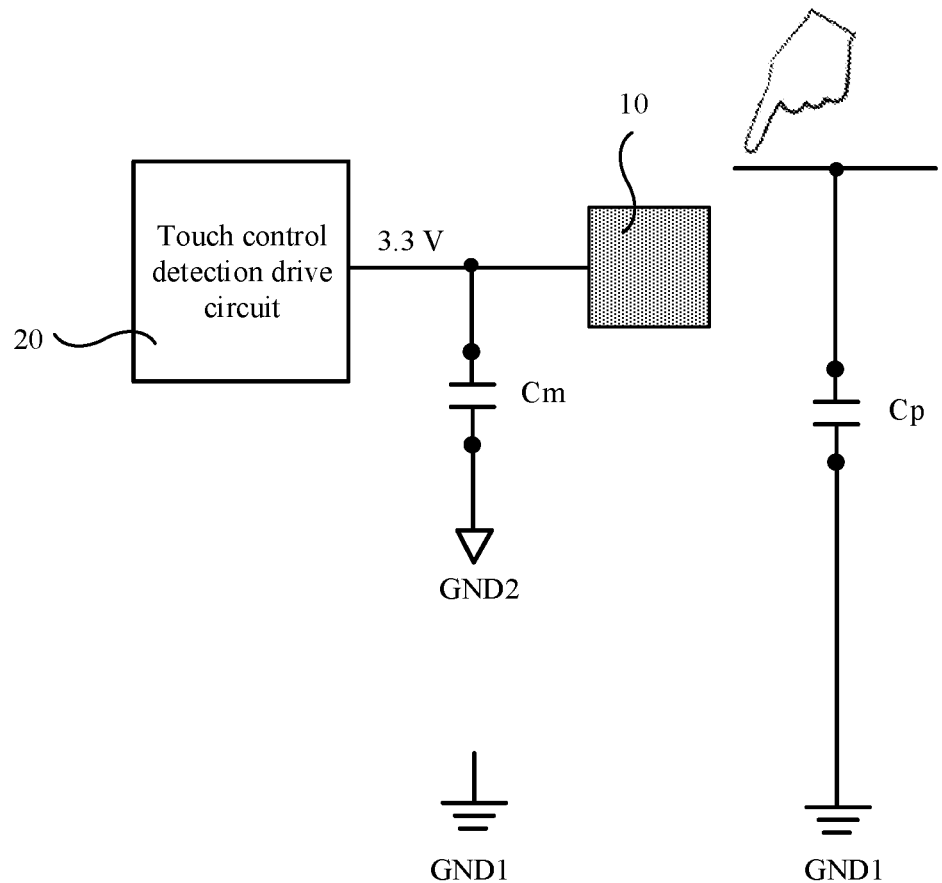
FIG. 8 is a schematic diagram of another touch control state according to an embodiment of this application.

In addition, as shown in FIG. 8, when the finger is close to the touch control electrode 10, the finger may be equivalent to the first reference ground GND1 (for example, 0 V), and an equivalent capacitor Cp is formed between the finger and the touch control electrode 10. In this case, the touch control electrode 10 and the finger equivalent to the first reference ground GND1 may be respectively used as a positive plate and a negative plate of the equivalent capacitor Cp. It can be learned from the foregoing that a voltage of the touch control electrode 10 is 23.3 V, and a voltage difference between the positive plate and the negative plate of the equivalent capacitor Cp may be about 23.3 V.

In this way, in the same charge/discharge time, in comparison with the solution shown in FIG. 4B, the voltage difference between the positive plate and the negative plate of the equivalent capacitor Cp may be increased from original 3.3 V to 23.3 V, to amplify an electrical signal used for detecting the charge/discharge time of the equivalent capacitor Cp, thereby achieving an objective of increasing resolution of signal detection of the equivalent capacitor Cp. In addition, in a process in which the touch control detection drive circuit 20 detects the charge/discharge times of the equivalent capacitor Cp and the parasitic capacitor Cm, because the voltage difference between the positive plate and the negative plate of the equivalent capacitor Cp is relatively large (for example, about 23.3 V), the voltage difference between the positive plate and the negative plate of the parasitic capacitor Cm is relatively small (for example, about 3.3 V). Therefore, although the detection performed by the touch control detection drive circuit 20 on the charge/discharge process of the parasitic capacitor Cm becomes noise, a ratio of noise to a detection signal obtained by detecting the charge/discharge process of the equivalent capacitor Cp is relatively small, to achieve an objective of improving a signal-to-noise ratio of touch control detection. This further helps accurately detect a touch control location when the finger of the user performs touch control in a floating state (as shown in FIG. 7, H≥20 mm). In this case, if the floating touch is performed by using the electronic device 01 provided in this embodiment of this application, when precision of the touch control detection is ensured, a detection range suitable for the floating touch may be increased from 5 mm to more than 20 mm. This helps improve a comfort level of the floating touch for the user.

In addition, in this application, a voltage of the second reference ground GND2 is boosted, to achieve an objective of increasing the detection range suitable for the floating touch and improving the precision of the touch control detection. In comparison with a solution of boosting the voltage of the touch control excitation signal S1, a semiconductor device in the electronic device 01 does not need to use a voltage-resistant and speed-resistant process, thereby reducing the production costs. In addition, a phenomenon of a breakdown of the touch control electrode 10 caused by an excessively high voltage (for example, 10 V) of the touch control excitation signal S1 can be avoided. In addition, in a solution of implementing touch control by using ultrasonic waves, time of flight (TOF), invisible light, or the like as a transmit signal, the finger can receive the transmit signal only in a specific region. However, in this application, the floating touch is implemented in a capacitive touch control manner, and a coverage area of the touch control electrode 10 may be adjusted as required, to increase an activity range of the user during the floating touch.

It should be noted that the foregoing description is provided by using an example in which the touch control electrode 10 is a self-capacitance electrode. When the touch control electrode includes the transmitting electrode TX and the receiving electrode RX shown in FIG. 6C, similarly, the receiving electrode RX may be disconnected from the first reference ground GND1 (for example, 0 V), and be electrically connected to the second reference ground GND2 (for example, a peak-to-peak voltage value may be about 20 V), so that the voltage difference between the positive plate and the negative plate of the parasitic capacitor Cm formed between the transmitting electrode TX and the receiving electrode RX is about 3.3 V. For the equivalent capacitor Cp formed between the finger equivalent to the first reference ground GND1 (for example, 0 V) and the transmitting electrode TX, the voltage difference between the positive plate and the negative plate of the equivalent capacitor Cp is about 23.3 V, thereby achieving the foregoing objective of improving the resolution and the signal-to-noise ratio of the touch control detection.

In conclusion, to improve the resolution and the signal-to-noise ratio of the touch control detection, a voltage of the negative plate of the parasitic capacitor Cm needs to be boosted from the original first reference ground GND1 (for example, 0 V) to the second reference ground GND2 (for example, a peak-to-peak voltage value may be about 20 V). In this case, for example, the touch control electrode 10 is a self-capacitance electrode. In order that the touch control detection drive circuit 20 provides the touch control excitation signal S1 for the touch control electrode 10 used as the positive plate of the parasitic capacitor Cm, the touch control detection drive circuit 20 needs to be disconnected (that is, isolated) from the first reference ground GND1 (for example, 0 V), and be electrically connected to the second reference ground GND2 (for example, a peak-to-peak voltage value may be about 20 V), to normally output the touch control excitation signal S1. The following uses an example in which the touch control electrode 10 is a self-capacitance electrode to describe in detail a disposing manner of the second reference ground GND2 and a power supply manner of the touch control detection drive circuit 20.

Figure 9A:
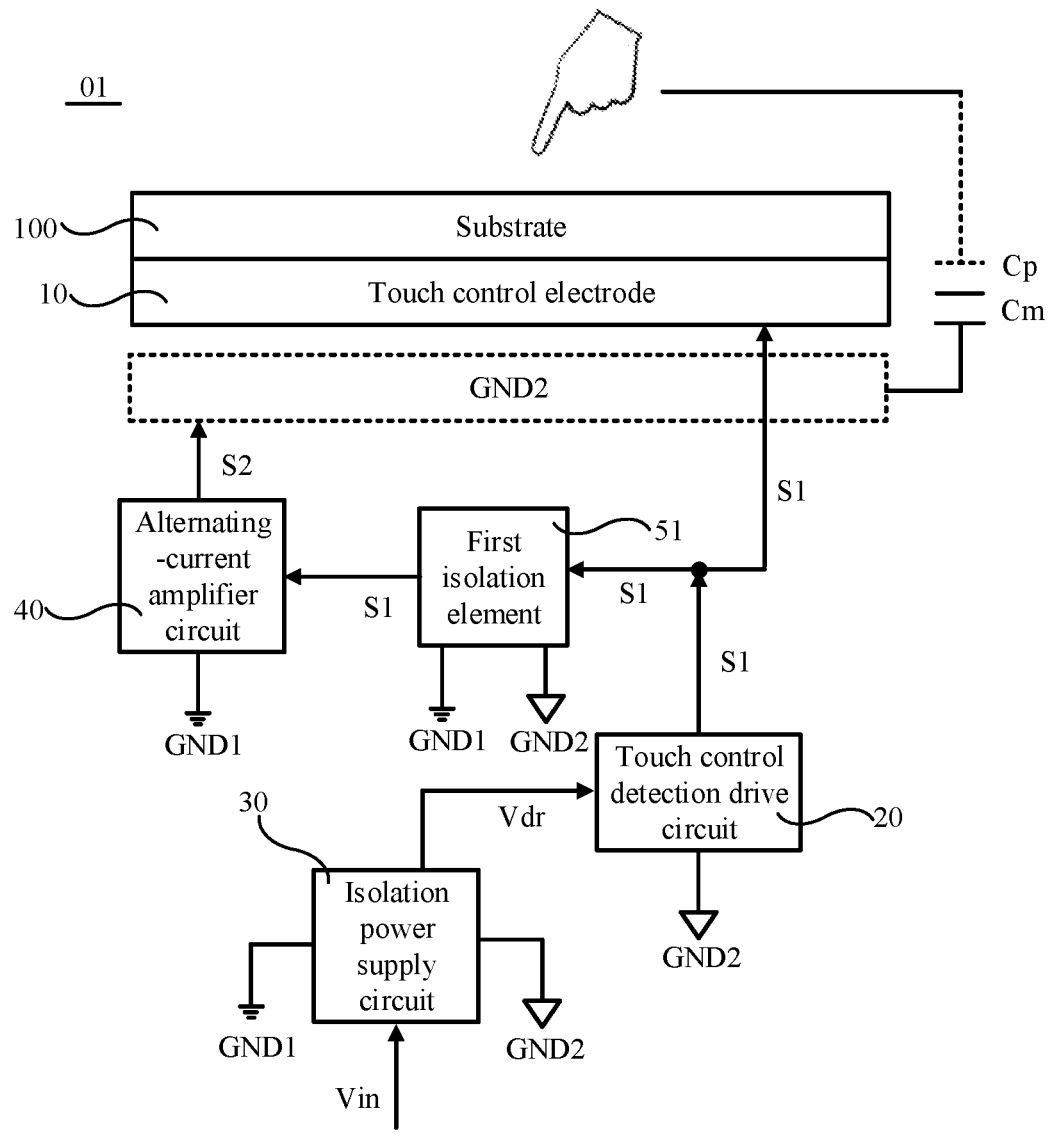
FIG. 9A is a schematic diagram of a structure of another electronic device according to an embodiment of this application.

The electronic device 01 further includes an isolation power supply circuit 30 and an alternating-current amplifier circuit 40 shown in FIG. 9A. The isolation power supply circuit is electrically connected to the touch control detection drive circuit 20, the first reference ground GND1, the second reference ground GND2, and a voltage source. The isolation power supply circuit 30 may be configured to insulate the first reference ground GND1 from the second reference ground GND2, to avoid signal interworking between the first reference ground GND1 and the second reference ground GND2; and is further configured to insulate the voltage source from the touch control detection drive circuit 20, to avoid signal interworking between the voltage source and the touch control detection drive circuit 20. In addition, the isolation power supply circuit 30 further receives a primary power supply voltage Vin provided by the voltage source, converts the primary power supply voltage Vin into a drive voltage Vdr of the touch control detection drive circuit 20, and couples the drive voltage Vdr of the touch control detection drive circuit 20 to the touch control detection drive circuit 20 through energy coupling, to supply power to the touch control detection drive circuit 200.

In this case, the touch control detection drive circuit 20 may be grounded by using the second reference ground GND2. Therefore, when the touch control detection drive circuit 200 receives the drive voltage Vdr output by the isolation power supply circuit 30, the touch control detection drive circuit 20 can be in a working state, and output the touch control excitation signal S1.

Figure 9B:
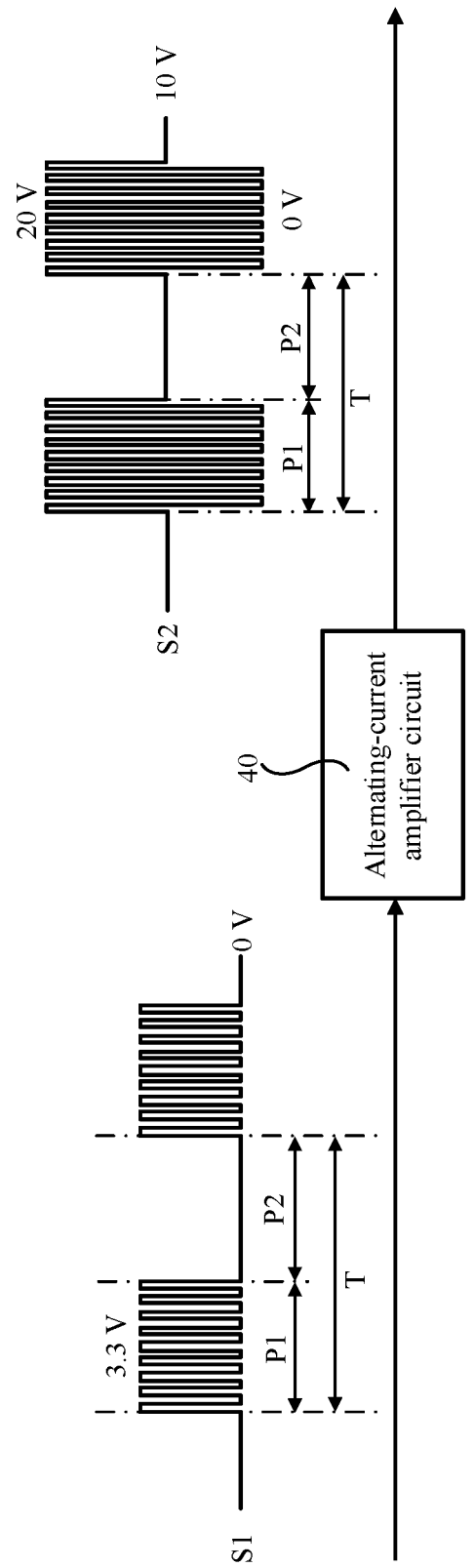
FIG. 9B is a waveform diagram of a voltage regulation signal according to an embodiment of this application.

In addition, the alternating-current amplifier circuit 40 receives and amplifies the touch control excitation signal S1 to generate a voltage regulation signal S2 shown in FIG. 9B, and transmits the voltage regulation signal S2 to the second reference ground GND2 shown in FIG. 9A. A peak-to-peak value of the voltage regulation signal S2 (for example, about 20 V) may be greater than a voltage value of the first reference ground (for example, 0 V). Therefore, the voltage of the second reference ground GND2 may be boosted to about 20 V.

In a process in which the alternating-current amplifier circuit 40 amplifies the touch control excitation signal S1, a period of the touch control excitation signal S1 is unchanged. Therefore, as shown in FIG. 9B, a low frequency part of the generated voltage regulation signal S2 still has the foregoing sampling period T (including the touch control phase P1 and the non-touch control phase P2). In addition, when the alternating-current amplifier circuit 40 has a voltage bias function, a central bias voltage (for example, 10 V) of the voltage regulation signal S2 may be set based on a preset amplification coefficient, and then a trough voltage (for example, 0 V) and a peak voltage (for example, 20 V) of the voltage regulation signal S2 are set, so that the peak-to-peak value (for example, about 20 V) of the voltage regulation signal S2 meets a requirement of the preset amplification coefficient.

In conclusion, a control process of the electronic device 01 may be that the isolation power supply circuit 30 converts the primary power supply voltage Vin into the drive voltage Vdr of the touch control detection drive circuit 20. In addition, the touch control detection drive circuit 20 that is grounded by using the second reference ground GND2 may output a touch control excitation signal S1 after receiving the drive voltage Vdr output by the isolation power supply circuit 30. In addition, the isolation power supply circuit 30 can isolate the first reference ground GND1 from the second reference ground GND2, and the alternating-current amplifier circuit 40 can boost a maximum voltage of the second reference ground GND2 to about 20 V, to implement the floating touch.

For example, the touch control detection drive circuit 20 provides the touch control excitation signal S1 for the touch control electrode 10. As shown in FIG. 5, a peak-to-peak value of the touch control excitation signal S1 may be 3.3 V. The alternating-current amplifier circuit 40 amplifies the touch control excitation signal S1, to generate the voltage regulation signal S2. As shown in FIG. 9B, the peak-to-peak value of the voltage regulation signal S2 may be 20 V. In this case, a voltage difference between the touch control electrode 10 and the second reference ground GND2 remains unchanged (that is, the capacitance value of the parasitic capacitor Cm remains unchanged). Therefore, a maximum value of a voltage on the touch control electrode 10 is 23.3 V.

In this case, in the touch control phase P1, when the finger performs a floating touch, the foregoing equivalent capacitor Cp is formed between the finger equivalent to the first reference ground GND1 (for example, 0 V) and the touch control electrode 10. The voltage difference between the two electrode plates (the finger and the touch control electrode 10) of the equivalent capacitor Cp may be 23.3 V. Therefore, an electrical signal used for detecting the charge/discharge time of the equivalent capacitor Cp is amplified, thereby achieving an objective of increasing resolution of signal detection of the equivalent capacitor Cp. In addition, the voltage difference between the two electrode plates (the touch control electrode 10 and the second reference ground GND2) of the parasitic capacitor Cm is 3.3 V. Therefore, a ratio of noise generated by the parasitic capacitor Cm to the detection signal obtained by detecting the charge/discharge process of the equivalent capacitor Cp is relatively small, to achieve the objective of improving the signal-to-noise ratio of the touch control detection, thereby implementing the floating touch.

It should be noted that the foregoing description is provided by using an example in which the peak-to-peak value of the touch control excitation signal S1 output by the touch control detection drive circuit 20 is 3.3 V, and the peak-to-peak value of the voltage regulation signal S2 output by the alternating-current amplifier circuit 40 to the second reference ground GND2 is 23.3 V. The peak-to-peak value of the touch control excitation signal S1 and an amplification factor n of the alternating-current amplifier circuit 40 are not limited in this application. For example, the peak-to-peak value of the touch control excitation signal S1 may be less than or equal to 5 V, and the amplification factor n of the alternating-current amplifier circuit 40 may be greater than or equal to 2, so that the peak-to-peak value of the voltage regulation signal S2 output by the alternating-current amplifier circuit 40 is greater than or equal to 10 V.

Figure 10:
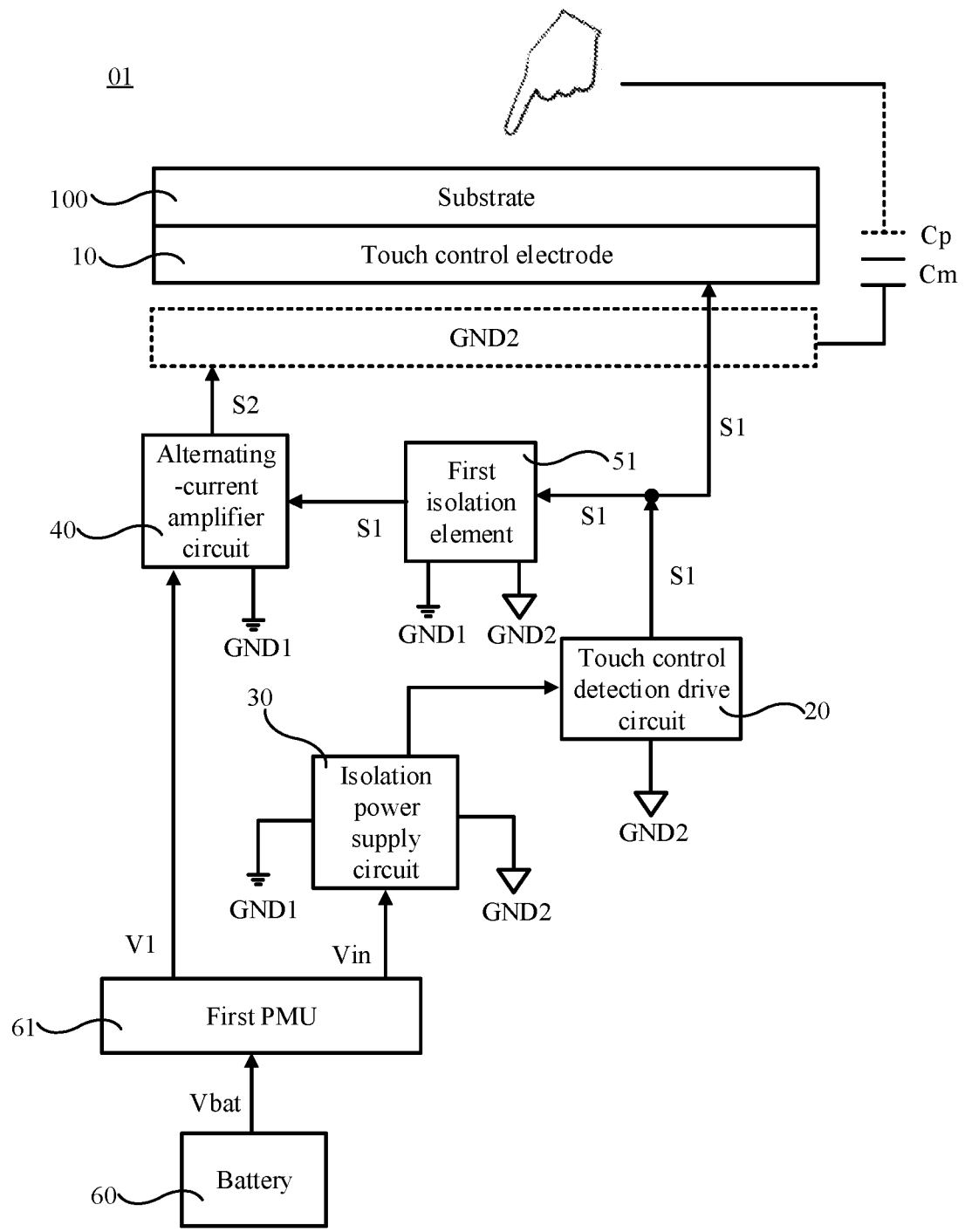
FIG. 10 is a schematic diagram of a structure of another electronic device according to an embodiment of this application.

In addition, to provide the primary power supply voltage Vin to the isolation power supply circuit 30 and supply power to the alternating-current amplifier circuit 40, in some embodiments of this application, as shown in FIG. 10, the electronic device 01 may further include a power supply configured to provide the primary power supply voltage Vin, and the power supply may include a battery 60 and a first power management unit (PMU) 61. The first PMU 61 is electrically connected to the battery 60, the isolation power supply circuit 30, and the alternating-current amplifier circuit 40. The first PMU 61 may convert a battery voltage Vbat of the battery 60 into the primary power supply voltage Vin, and transmit the primary power supply voltage Vin to the isolation power supply circuit 30. In addition, the first PMU 61 may further convert the battery voltage Vbat of the battery 60 into a working voltage V1 of the alternating-current amplifier circuit 40, to supply power to the alternating-current amplifier circuit 40.

Figure 11A:
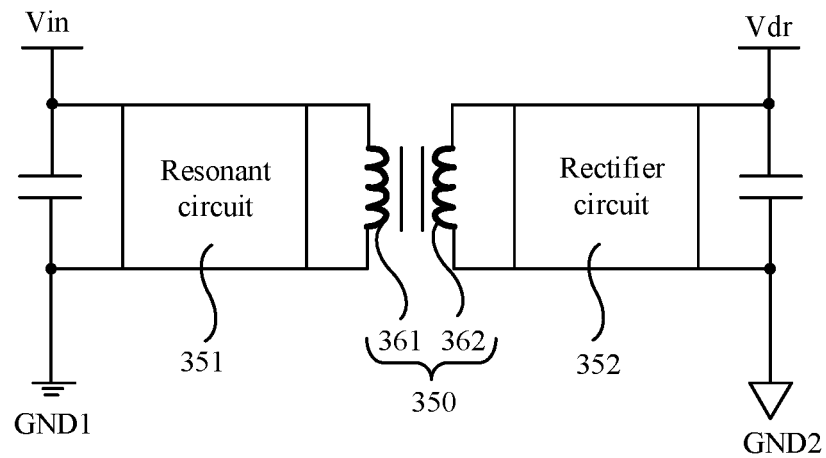
FIG. 11A is a schematic diagram of a structure of an isolation power supply circuit according to an embodiment of this application.

In some embodiments of this application, as shown in FIG. 11A, the isolation power supply circuit 30 may include a transformer 350, a resonant circuit 351, and a rectifier circuit 352. The transformer 350 includes a primary-side winding 361 and a secondary-side winding 362. The resonant circuit 351 may be electrically connected to the primary-side winding 361, the first reference ground GND1, and the first PMU 61 shown in FIG. 10.

The resonant circuit 351 may be configured to convert the primary power supply voltage Vin output by the first PMU 61 into an alternating current voltage, and transmit the alternating current voltage to the primary-side winding 362. The rectifier circuit 352 is electrically connected to the secondary-side winding 362, the second reference ground GND2, and the touch control detection drive circuit 20 shown in FIG. 10. The rectifier circuit 352 is configured to convert an alternating current voltage generated through induction of the secondary-side winding 362 into the drive voltage Vdr of the touch control detection drive circuit 20.

In some embodiments of this application, the resonant circuit 351 may include an LC resonant network and a bridge circuit mainly including switch transistors. The switch transistor in the bridge circuit is controlled to be turned on and turned off, to charge and discharge an inductor and a capacitor in the LC resonant network. Therefore, in the charge/discharge process, the primary power supply voltage Vin as a direct current voltage is converted into the alternating current voltage. After the alternating current voltage is applied to the primary-side winding 362 of the transformer 350, an alternating current flowing through the primary-side winding 362 generates a changing magnetic field, and the secondary-side winding 362 generates an alternating current in the magnetic field through induction. The rectifier circuit 352 converts the alternating current generated by the secondary-side winding 362 into a direct current, and supplies power to the touch control detection drive circuit 20. In this case, a drive voltage Vdr independent of the primary power supply voltage Vin may be provided for the touch control detection drive circuit 20 grounded by using the second reference ground GND2.

Figure 11B:
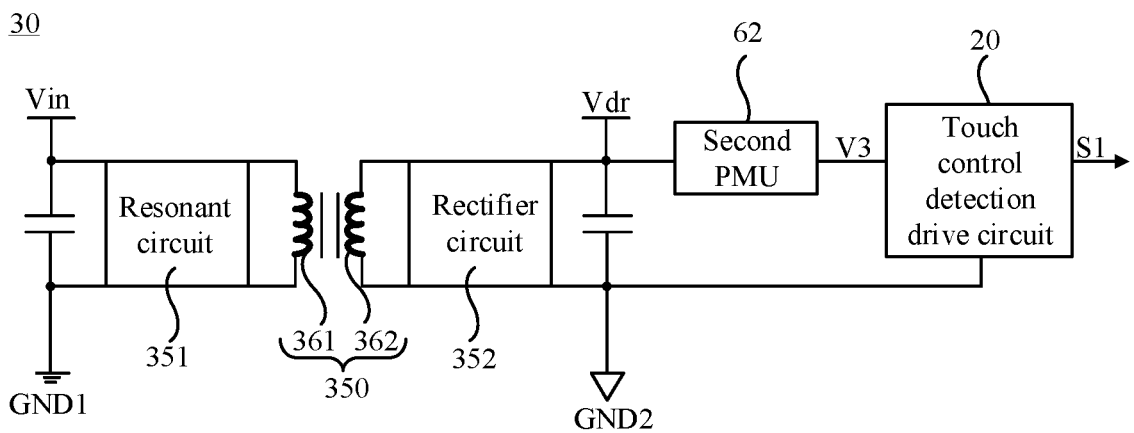
FIG. 11B is a schematic diagram of a structure of another isolation power supply circuit according to an embodiment of this application.

In addition, when the drive voltage Vdr is greater than a working voltage V3 of the touch control detection drive circuit 20, as shown in FIG. 11B, a second PMU 62 may be disposed between the isolation power supply circuit 30 and the touch control detection drive circuit 20. The second PMU 62 may convert the drive voltage Vdr into the working voltage V3 of the touch control detection drive circuit 20.

The foregoing description is provided by using an example in which the isolation power supply circuit 30 performs isolated power supply for the touch control detection drive circuit 20 mainly by using the transformer 350. In some other embodiments of this application, the transformer 350 may be further replaced with a capacitor, for example, a multi-terminal capacitor. The multi-terminal capacitor may include at least two plates. One of the at least two plates may be electrically connected to the first reference ground GND1 and the voltage source configured to provide the primary power supply voltage Vin. In addition, the other one of the at least two plates may be electrically connected to the second reference ground GND2 and the touch control detection drive circuit 20.

In this way, the first reference ground GND1 and the second reference ground GND2 are connected to different plates of the multi-terminal capacitor, so that the first reference ground GND1 can be insulated from the second reference ground GND2 by using the multi-terminal capacitor. In addition, the voltage source configured to provide the primary power supply voltage Vin and the touch control detection drive circuit 20 are connected to different plates of the multi-terminal capacitor, so that the voltage source can be insulated from the touch control detection drive circuit 20 by using the multi-terminal capacitor. In addition, in a charge/discharge process of the multi-terminal capacitor, the primary power supply voltage Vin may be converted into the drive voltage Vdr through capacitance coupling, and the drive voltage Vdr is coupled to the touch control detection drive circuit 20, to supply power to the touch control detection drive circuit 20.

Figure 12A:
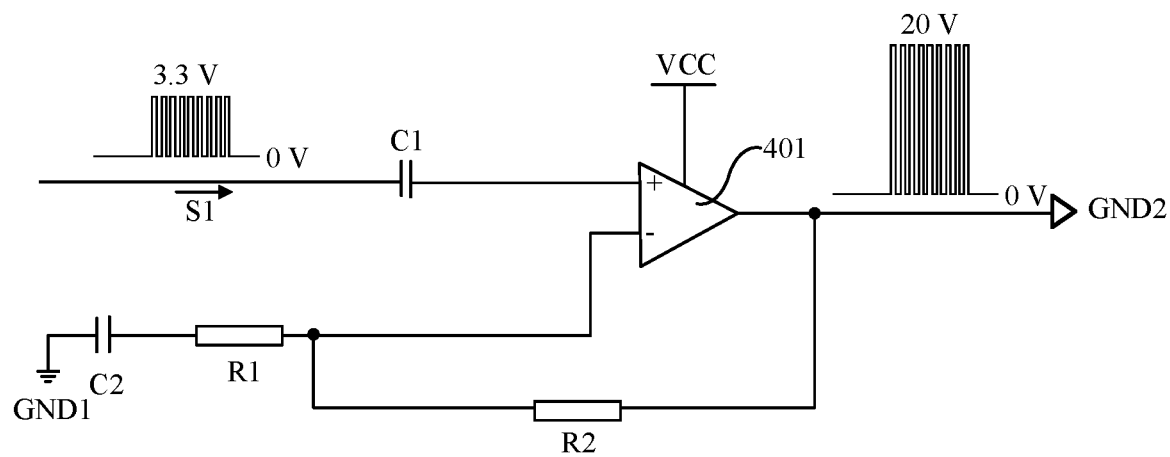
FIG. 12A is a schematic diagram of a cross-sectional structure of an alternating-current amplifier circuit according to an embodiment of this application.

On this basis, the alternating-current amplifier circuit 40 provided in this embodiment of this application may include an operational amplifier 401, a first capacitor C1, a second capacitor C2, a first resistor R1, and a second resistor R2 shown in FIG. 12A. A first end of the first capacitor C1 is electrically connected to the touch control detection drive circuit shown in FIG. 10, to receive the touch control excitation signal S1 output by the touch control detection drive circuit 20. A second end of the first capacitor C1 is electrically connected to a positive input end ("+") of the operational amplifier 401.

A first end of the first resistor R1 is electrically connected to a negative input end ("—") of the operational amplifier 401, and a second end of the first resistor R1 is electrically connected to a first end of the second capacitor C2. A second end of the second capacitor C2 is electrically connected to the first reference ground GND1. A first end of the second resistor R2 is electrically connected to the negative input end ("—") of the operational amplifier 401, and a second end of the second resistor R2 is electrically connected to an output end of the operational amplifier 401. The output end of the operational amplifier 401 is electrically connected to the second reference ground GND2, and a control end of the operational amplifier 401 is electrically connected to a control voltage end VCC.

In this case, the touch control excitation signal S1 as an alternating current signal may be transmitted to the positive input end ("+") of the operational amplifier 401 by using the first capacitor C1. The first resistor R1, the second resistor R2, and the second capacitor C2 may form an alternating-current amplifier unit. The alternating-current amplifier unit can amplify the peak-to-peak voltage value (for example, 3.3 V) of the touch control excitation signal S1 by R2/R1 times, so that a peak-to-peak value of a voltage at the output end of the operational amplifier 401 can be close to a full scale of the operational amplifier 401 (that is, a voltage value of the control voltage end VCC, for example, 20 V). In this way, the voltage of the second reference ground GND2 can be boosted to 20 V.

Figure 12B:
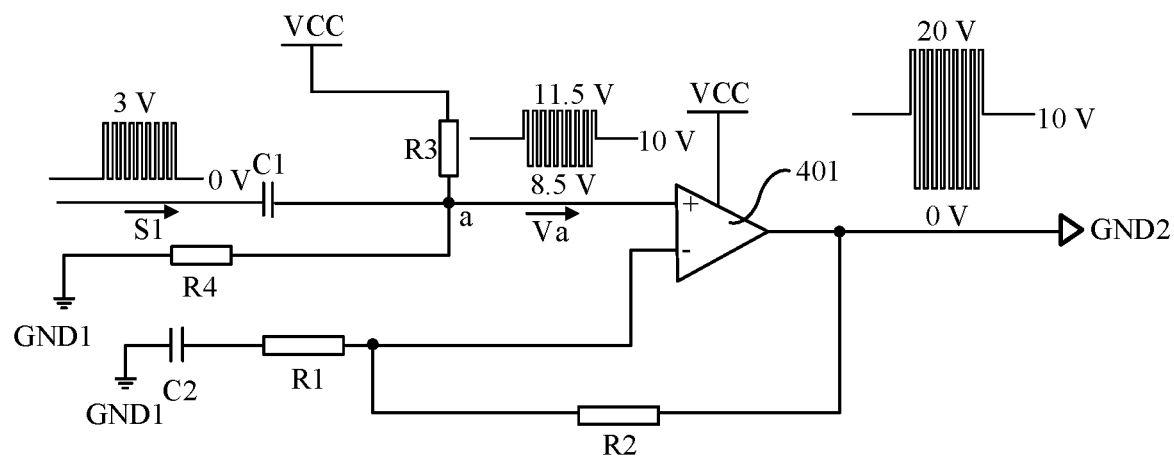
FIG. 12B is a schematic diagram of a structure of another alternating-current amplifier circuit according to an embodiment of this application.

Alternatively, in some other embodiments of this application, the alternating-current amplifier circuit 40 may further have a voltage bias function. For example, as shown in FIG. 12B, the alternating-current amplifier circuit 40 may further include a third resistor R3 and a fourth resistor R4. A first end of the third resistor R3 is electrically connected to the control voltage end VCC, and a second end of the third resistor R3 is electrically connected to the positive input end ("+") of the operational amplifier 401. A first end of the fourth resistor R4 is electrically connected to the positive input end ("+") of the operational amplifier 401, and a second end of the fourth resistor R4 is electrically connected to the first reference ground GND1. The third resistor R3 and the fourth resistor R4 have a same resistance value.

In this way, under a voltage division function of the third resistor R3 and the fourth resistor R4, a central bias voltage Va may be generated at a central bias point a. For example, when the voltage value of the control voltage end VCC is 20 V, the central bias voltage Va may be 10 V. In this case, for example, the peak-to-peak voltage value of the touch control excitation signal S1 is 3 V. When the touch control excitation signal S1 as the alternating current signal is superimposed on the positive input end ("+") of the operational amplifier 401 by using the first capacitor C1, for a voltage at the positive input end ("+") of the operational amplifier 401, a low level of the voltage is 8.5 V (10 V−1.5 V=8.5 V), a high level of the voltage is 11.5 V (10 V+1.5 V=11.5 V), and a central bias voltage Va is 10 V.

On this basis, also under an amplification function of the alternating-current amplifier unit that may be formed by the first resistor R1, the second resistor R2, and the second capacitor C2, the peak-to-peak value of the voltage at the output end of the operational amplifier 401 may be close to the full scale (that is, the voltage value of the control voltage end VCC, for example, 20 V) of the operational amplifier 401. In this way, the voltage of the second reference ground GND2 can be boosted to 20 V. The central bias voltage Va is generated at the central bias point a by using the third resistor R3 and the fourth resistor R4, so that an operational amplification process of the operational amplifier 401 can be more stable.

Figure 13:
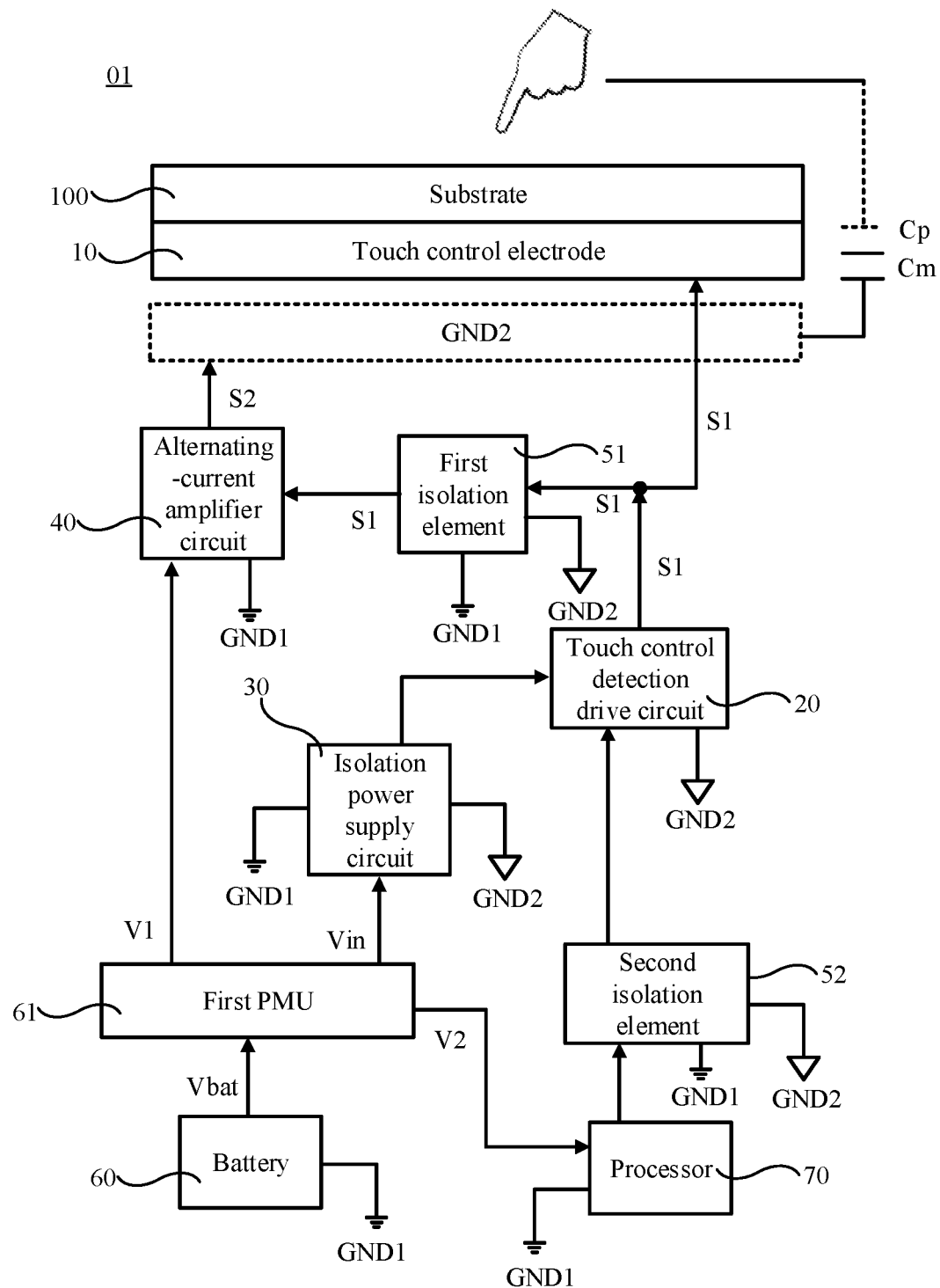
FIG. 13 is a schematic diagram of a structure of another electronic device according to an embodiment of this application.

On this basis, to enable the alternating-current amplifier circuit 40 to work normally, the battery 60 needs to supply power to the alternating-current amplifier circuit 40 by using the first PMU 61, and the alternating-current amplifier circuit 40 further needs to be electrically connected to the first reference ground GND1 to implement grounding. It can be learned from the foregoing that the touch control detection drive circuit 20 is electrically connected to the second reference ground GND2 to implement grounding, and the touch control excitation signal S1 output by the touch control detection drive circuit 20 needs to be transmitted to the alternating-current amplifier circuit 40. In this case, to implement signal transmission (that is, transmission of the touch control excitation signal S1) between the alternating-current amplifier circuit 40 and the touch control detection drive circuit 20 that are connected to different ground ends (the first reference ground GND1 and the second reference ground GND2), in some embodiments of this application, as shown in FIG. 13, the electronic device 01 may further include a first isolation element 51. The first isolation element 51 is coupled between the touch control detection drive circuit 20 and the alternating-current amplifier circuit 40. The first isolation element 51 is configured to couple the touch control excitation signal S1 output by the touch control detection drive circuit 20 to the alternating-current amplifier circuit 40.

In addition, as shown in FIG. 13, the electronic device 01 may further include a processor 70. The processor 70 may be a central processing unit (CPU) or a system on a chip (SOC). The first PMU 61 may convert the battery voltage Vbat of the battery 60 into a working voltage V2 of the processor 70. The processor 70 may receive a detection result of the touch control detection drive circuit 20, and determine a touch control location of the finger, a gesture type, and the like based on the detection result. In addition, the processor 70 may further output a control signal to the touch control detection drive circuit 20, to control a touch control detection process of the touch control detection drive circuit 20.

The processor 70 needs to be electrically connected to the first reference ground GND1 to implement grounding. It can be learned from the foregoing that the touch control detection drive circuit 20 is electrically connected to the second reference ground GND2 to implement grounding. In this case, to implement signal transmission between the processor 70 and the touch control detection drive circuit 20 that are connected to different ground ends (the first reference ground GND1 and the second reference ground GND2), in some embodiments of this application, as shown in FIG. 13, the electronic device 01 may further include a second isolation element 52. The second isolation element 52 is coupled between the processor 70 and the touch control detection drive circuit 20. The second isolation element 52 is configured to couple a control signal output by the processor 70 to the touch control detection drive circuit and couple a touch control detection result obtained by the touch control detection drive circuit 20 to the processor 70.

Figure 14A:
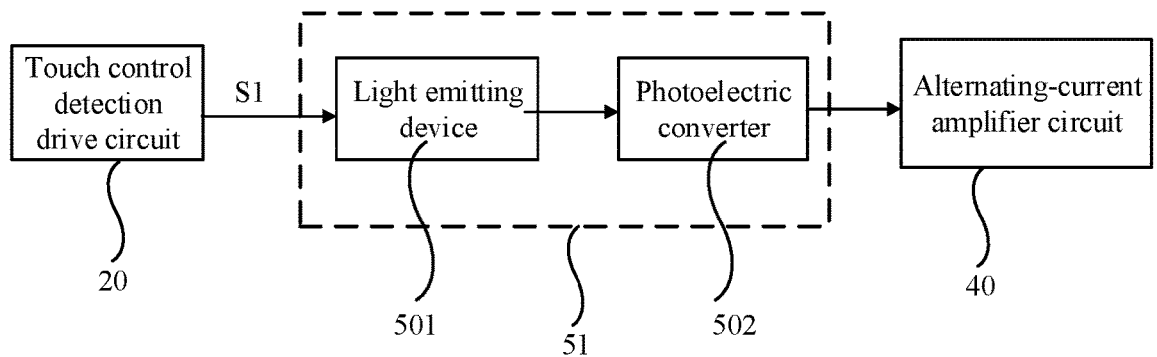
FIG. 14A is a schematic diagram of a structure of a first isolation element according to an embodiment of this application.

In some embodiments of this application, a structure of the first isolation element 51 may be shown in FIG. 14A, and includes a light emitting device 501 and an optical-to-electrical converter 502. The light emitting device 501 may be electrically connected to the touch control detection drive circuit 20, and is configured to convert the touch control excitation signal S1 from the touch control detection drive circuit 20 into an optical signal. The optical-to-electrical converter 502 may be electrically connected to the alternating-current amplifier circuit 40, and is configured to: convert the optical signal into an electrical signal, and transmit the electrical signal to the alternating-current amplifier circuit 40. In this case, the first isolation element 51 performs coupling transmission of a signal in an optical coupling manner. The light emitting device 501 may be a light emitting diode or a laser transmitter.

Figure 14B:
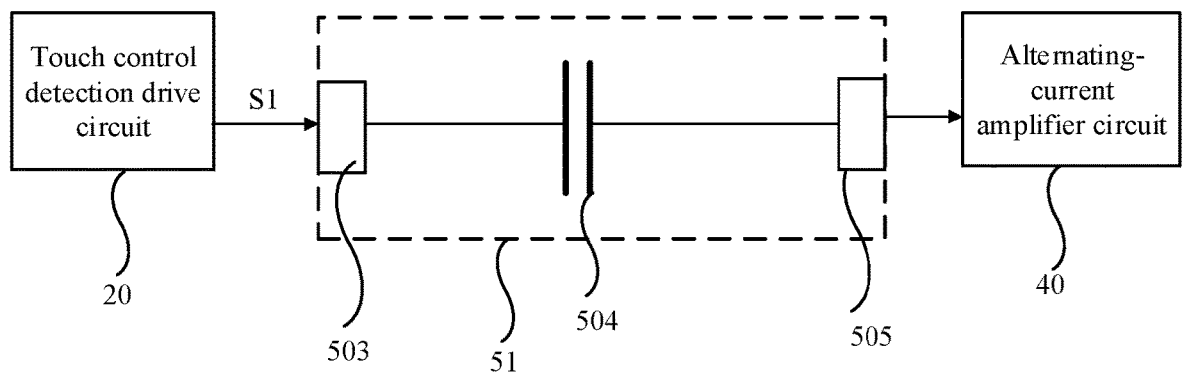
FIG. 14B is a schematic diagram of a structure of another first isolation element according to an embodiment of this application.

Alternatively, in some other embodiments of this application, a structure of the first isolation element 51 may be shown in FIG. 14B, and includes a signal input interface 503, an isolation capacitor 504, and a signal output interface 505. The signal input interface 503 is electrically connected to the touch control detection drive circuit 20, and is configured to receive the touch control excitation signal S1 from the touch control detection drive circuit 20. A first end of the isolation capacitor 504 is electrically connected to the signal input interface 503, and a second end of the isolation capacitor 504 is electrically connected to the signal output interface 505. The isolation capacitor 504 is configured to transmit, to the alternating-current amplifier circuit 40 by using the signal output interface 505, the touch control excitation signal S1 received by the signal input interface 503. In this case, the first isolation element 51 performs coupling transmission of a signal in a capacitive coupling manner.

Figure 14C:
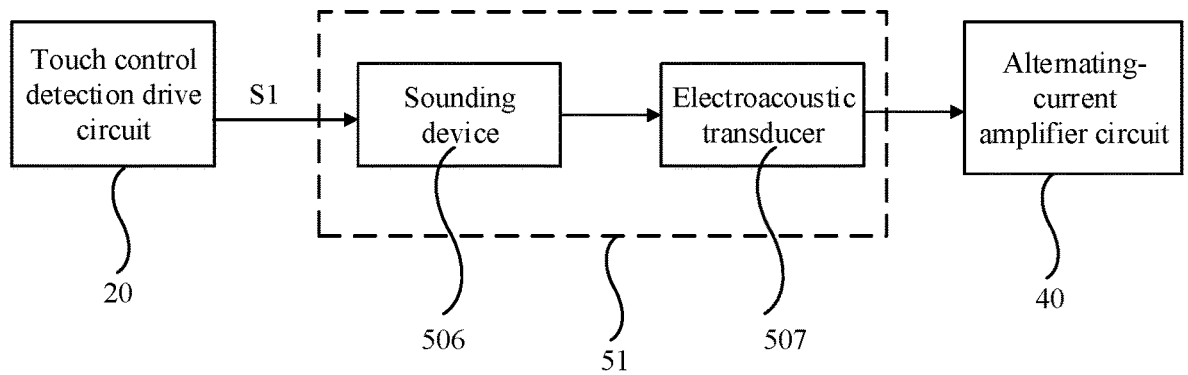
FIG. 14C is a schematic diagram of a structure of another first isolation element according to an embodiment of this application.

Alternatively, in some other embodiments of this application, a structure of the first isolation element 51 may be shown in FIG. 14C, and includes a sounding device 506 and an electroacoustic transducer 507. The sounding device 506 is electrically connected to the touch control detection drive circuit 20, and is configured to convert a touch control excitation signal S1 from the touch control detection drive circuit 20 into a sound signal. The electroacoustic transducer 507 is electrically connected to the alternating-current amplifier circuit 40, and is configured to: convert the sound signal into the electrical signal, and transmit the electrical signal to the alternating-current amplifier circuit 40. In this case, the first isolation element 51 performs coupling transmission of a signal in a sound coupling manner.

In addition, in some other embodiments of this application, the first isolation element 51 may further include a transformer. A primary-side winding of the transformer is electrically connected to the touch control detection drive circuit 20, and a secondary-side winding is electrically connected to the alternating-current amplifier circuit 40. In this way, coupling transmission of a signal is performed in an electromagnetic coupling manner of the transformer.

It should be noted that a structure of the first isolation element 51 is used as an example for description. A structure of the second isolation element 62 can be obtained in the same manner. Details are not described herein again.

Figure 15:
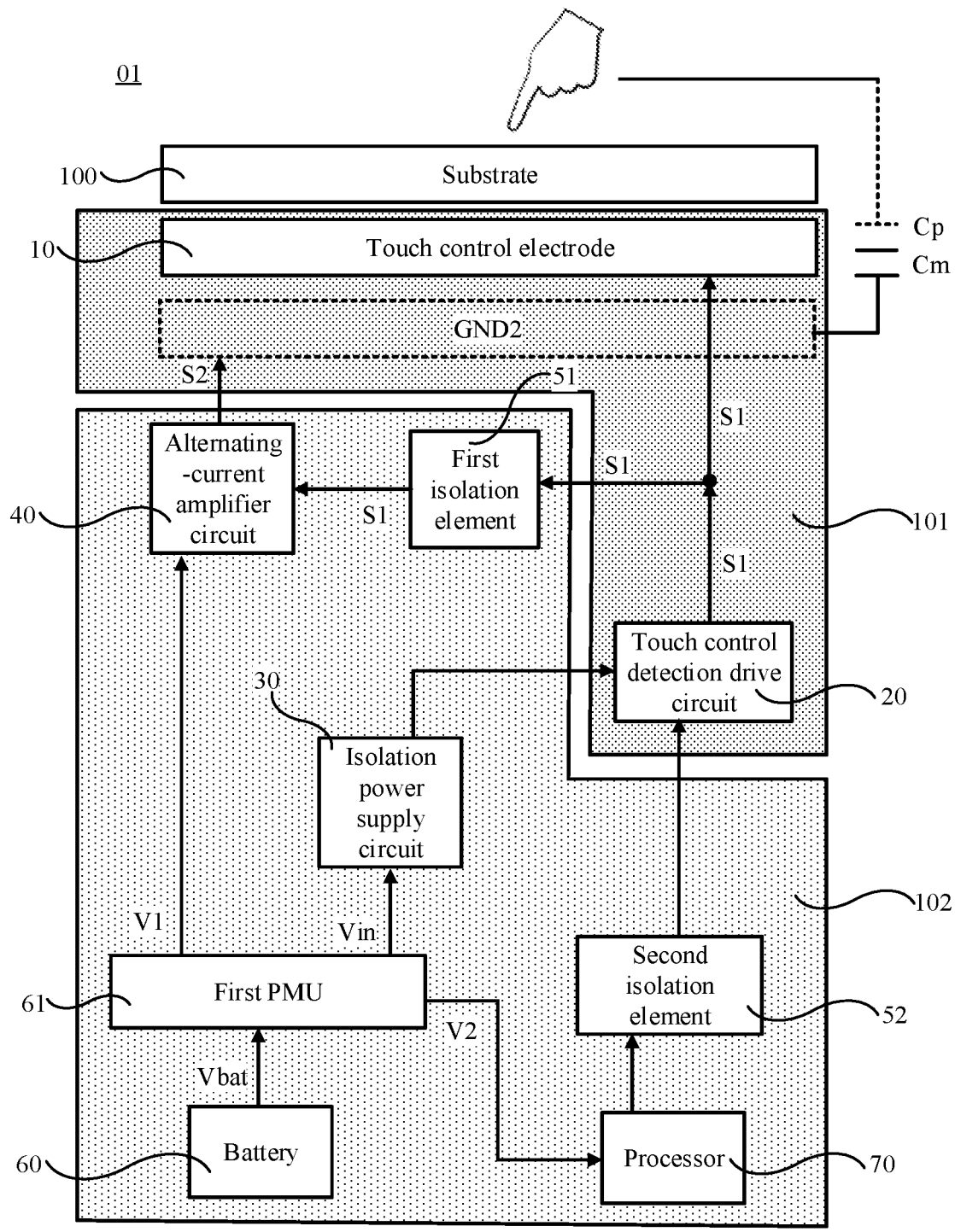
FIG. 15 is a schematic diagram of a structure of another electronic device according to an embodiment of this application.

On this basis, as shown in FIG. 15, the electronic device 01 may further include a first circuit board 101 and a second circuit board 102, so that the touch control detection drive circuit 20 can be grounded by using the second reference ground GND2 after being isolated from the first reference ground GND1, and other control circuits in the electronic device 01 such as the processor 70, the isolation power supply circuit 30, the alternating-current amplifier circuit 40, the first isolation element 51, the second isolation element 52, and the first PMU 61 can be grounded by using the first reference ground GND1 during working. Both the first circuit board 101 and the second circuit board 102 may be PCB boards. The PCB board may include a plurality of layers of copper foil and a dielectric layer disposed between any two adjacent layers of the copper foil.

On this basis, the second reference ground GND2 may be disposed in the first circuit board 101. For example, a layer of the copper foil in the first circuit board 101 may be used as a reference ground plane on which the second reference ground GND2 is located. In this case, as shown in FIG. 15, the touch control detection drive circuit 20 may be disposed on the first circuit board 101, so that the touch control detection drive circuit 20 can be electrically connected to the second reference ground GND2 to implement grounding.

In addition, the first reference ground GND1 may be disposed in the second circuit board 102. For example, a layer of the copper foil in the second circuit board 102 may be used as a reference ground plane on which the first reference ground GND1 is located. In this case, as shown in FIG. 15, other control circuits in the electronic device 01 such as the processor 70, the isolation power supply circuit 30, the alternating-current amplifier circuit 40, the first isolation element 51, the second isolation element 52, and the first PMU 61 may be disposed on the second circuit board 102, so that the other control circuits can be electrically connected to the first reference ground GND1, to implement grounding.

It should be noted that, as shown in FIG. 13, the isolation power supply circuit 30, the first isolation element 51, and the second isolation element 52 are all electrically connected to the first reference ground GND1 and the second reference ground GND2. Therefore, in some embodiments of this application, as shown in FIG. 15, the isolation power supply circuit 30, the first isolation element 51, and the second isolation element 52 may be disposed on the second circuit board 102, so that the isolation power supply circuit 30, the first isolation element 51, and the second isolation element 52 are directly electrically connected to the first reference ground GND1 in the second circuit board 102, and are electrically connected to the second reference ground GND2 in the first circuit board 101 through wiring.

Alternatively, in some other embodiments of this application, the isolation power supply circuit 30, the first isolation element 51, and the second isolation element 52 may be disposed on the first circuit board 101, so that the isolation power supply circuit 30, the first isolation element 51, and the second isolation element 52 are directly electrically connected to the second reference ground GND2 in the first circuit board 101, and are electrically connected to the first reference ground GND2 in the second circuit board 102 through wiring. For ease of description, the following description is provided by using an example in which the isolation power supply circuit 30, the first isolation element 51, and the second isolation element 52 are disposed on the second circuit board 102.

Alternatively, in some other embodiments of this application, the processor 70 and the touch control detection drive circuit 20 may be disposed on the first circuit board 101. In this case, both the processor 70 and the touch control detection drive circuit 20 may be electrically connected to the second reference ground GND2 in the first circuit board 101, to implement grounding. In this case, the processor 70 and the touch control detection drive circuit are electrically connected to the same reference ground, that is, the second reference ground GND2. Therefore, there is no need to dispose the second isolation element 52 between the processor 70 and the touch control detection drive circuit 20. In addition, another circuit structure electrically connected to the processor 70, for example, a Bluetooth circuit may also be disposed together with the processor 70 in the first circuit board 101.

Figure 16A:
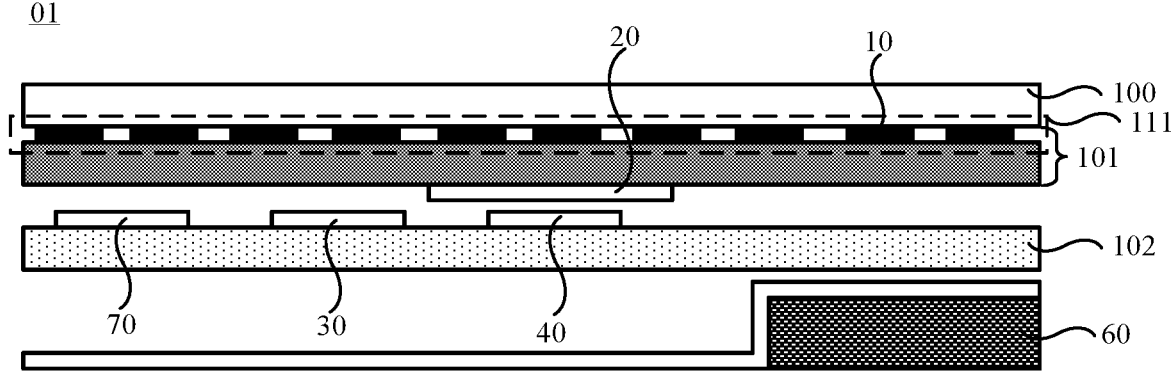
FIG. 16A is a schematic diagram of a cross-sectional structure of an electronic device according to an embodiment of this application.

In some embodiments of this application, as shown in FIG. 16A, the first circuit board 101 and the second circuit board 102 may be disposed in a stacked manner. In comparison with the second circuit board 102, the first circuit board 101 is disposed closer to the cover 100. It can be learned from the foregoing that the first circuit board 101 includes the plurality of layers of the copper foil. A layer of the copper foil closest to the cover 100 in the plurality of layers of the copper foil 101 may be referred to as first copper foil 111. When the electronic device 01 is a touchpad without a display function, and the touchpad uses a self-capacitance touch control manner, the first copper foil 111 may include a plurality of block-shaped touch control electrodes 10 disposed at intervals. In this way, the touch control electrode 10 may be manufactured by using one layer of the copper foil in the first circuit board 101. The touch control electrode 10 may be connected to the cover 100 by using an adhesive layer.

Figure 16B:
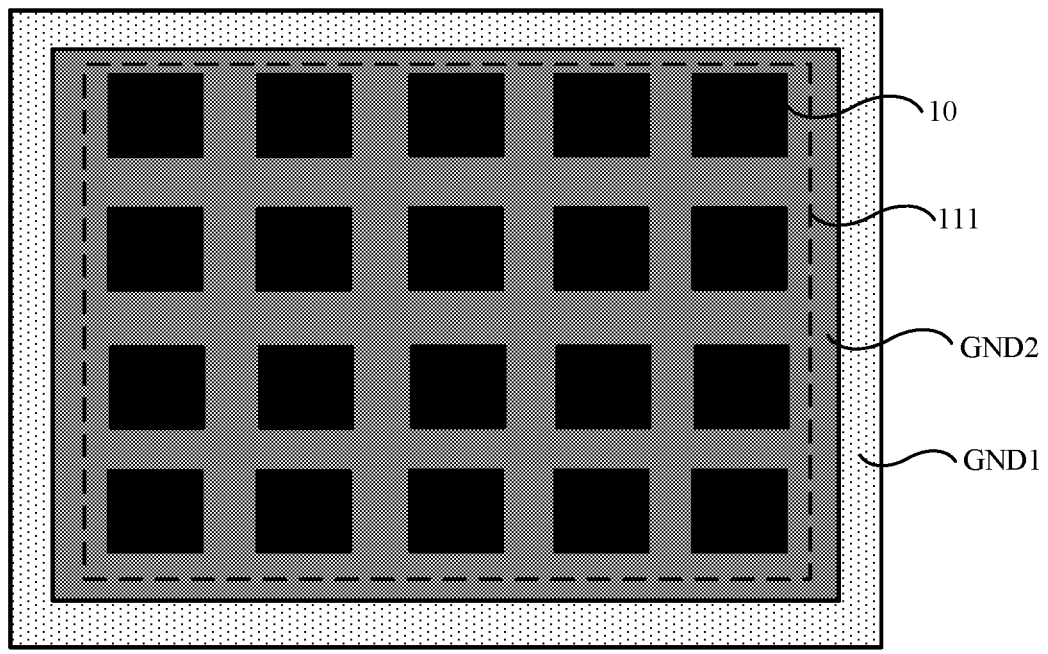
FIG. 16B is a schematic diagram of a touch control electrode, a first reference ground, and a second reference ground according to an embodiment of this application.

It can be learned from the foregoing that, one layer of the copper foil in the first circuit board 101 may be used as the reference ground plane on which the second reference ground GND2 is located, and one layer of the copper foil in the second circuit board 102 may be used as the reference ground plane on which the first reference ground GND1 is located. In this case, when the first circuit board 101 and the second circuit board 102 are disposed in a stacked manner, as shown in FIG. 16B (a top view of FIG. 16A), the second reference ground GND2 and the first reference ground GND1 may be disposed in a stacked manner. Vertical projections of the plurality of touch control electrodes 10 (for example, the self-capacitance electrodes) formed by the first copper foil 111 in the first circuit board on the second reference ground GND2 are all located in the plane on which the second reference ground GND2 is located.

Figure 16C:
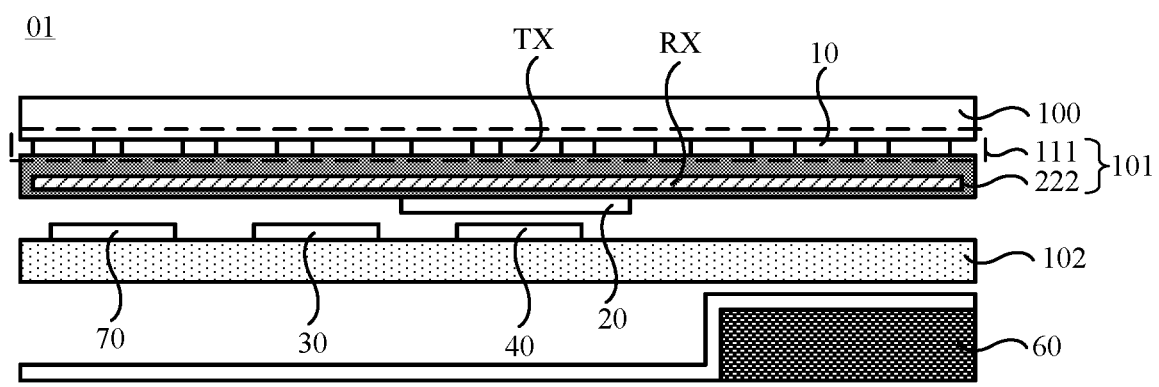
FIG. 16C is a schematic diagram of a cross-sectional structure of another electronic device according to an embodiment of this application.

Alternatively, when the touchpad uses a mutual capacitance touch control manner, as shown in FIG. 16C (a cutaway drawing obtained by cutting along a dashed line 0-0 in FIG. 6A), the first circuit board 101 may include the first copper foil 111 and second copper foil 222 that are stacked and insulated. There is an insulation layer between the first copper foil 111 and the second copper foil 222. The first copper foil 111 may include the foregoing plurality of transmitting electrodes TX. The second copper foil 222 may include the foregoing plurality of receiving electrodes RX. As shown in FIG. 16C, the cover 100 may be connected to the plurality of transmitting electrodes TX by using an adhesive layer. In this case, the first copper foil 111 is copper foil that is in the first circuit board 101 and that is closest to the cover 100. Alternatively, the cover 100 may be connected to the plurality of receiving electrodes RX by using an adhesive layer. In this case, the second copper foil 222 is copper foil that is in the first circuit board 101 and that is closest to the cover 100.

On this basis, as shown in FIG. 16A or FIG. 16C, the touch control detection drive circuit 20 may be disposed on a surface on a side that is of the first circuit board 101 and that is away from the cover 100. In addition, other control circuits in the electronic device 01 such as the processor 70, the isolation power supply circuit 30, and the alternating-current amplifier circuit 40 may be disposed on a surface on a side that is of the second circuit board 102 and that is close to the first circuit board 101, or may be disposed on a surface on a side that is of the second circuit board 102 and that is away from the first circuit board 101. Other control circuits (for example, the processor 70, the isolation power supply circuit 30, and the alternating-current amplifier circuit 40) on the second circuit board 101 may be electrically connected to the touch control detection drive circuit 20 located on the first circuit board 101 by using an inter-board connector, a flat cable, or a similar manner. In addition, the battery 60 disposed on a side that is of the second circuit board 102 and that is away from the first circuit board 101 may supply power to the control circuit.

In this way, the first circuit board 101 and the second circuit board 102 are disposed, so that the touch control detection drive circuit 20 and another control circuit (for example, the processor 70, the isolation power supply circuit 30, and the alternating-current amplifier circuit 40) in the electronic device can be disposed on different circuit boards. In this case, in a process of attaching the first circuit board 101 to the cover 100 by using a large quantity of double-sided tapes, a fault of the foregoing another control circuit can be avoided in the attaching process, and the touch control detection drive circuit 20 on the first circuit board 101 can be tested. In addition, there are usually a relatively large quantity of touch control electrodes 10 in the electronic device 01, for example, 400, so that there are also a relatively large quantity of signal lines used for electrically connecting the touch control electrodes 10 and the touch control detection drive circuit 20. Therefore, the touch control detection drive circuit 20 and the touch control electrodes 10 need to be disposed on a same circuit board, to facilitate connection of the foregoing signal lines.

Figure 17A:
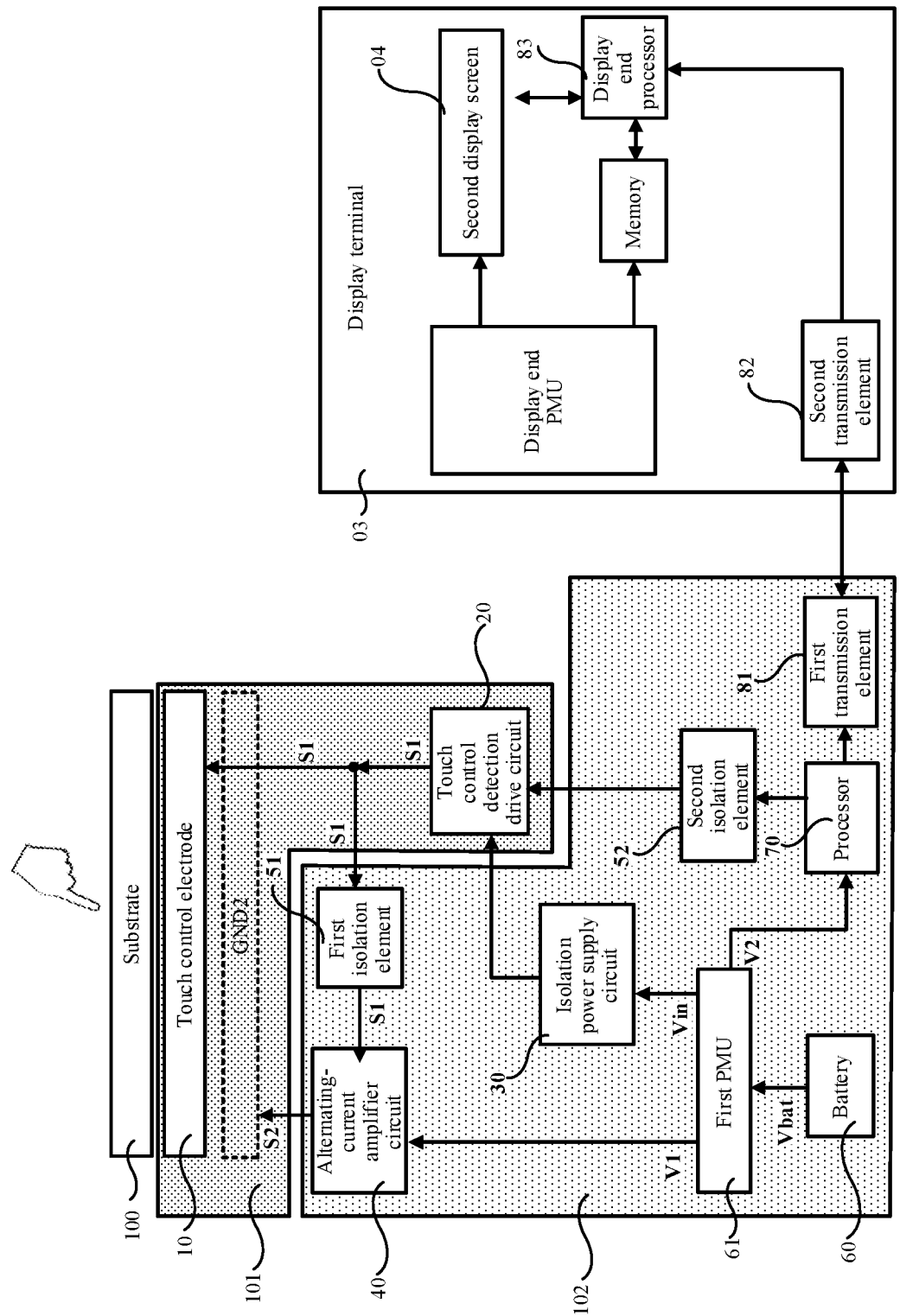
FIG. 17A is a schematic diagram of a structure of a touch control system according to an embodiment of this application.
Figure 17B:
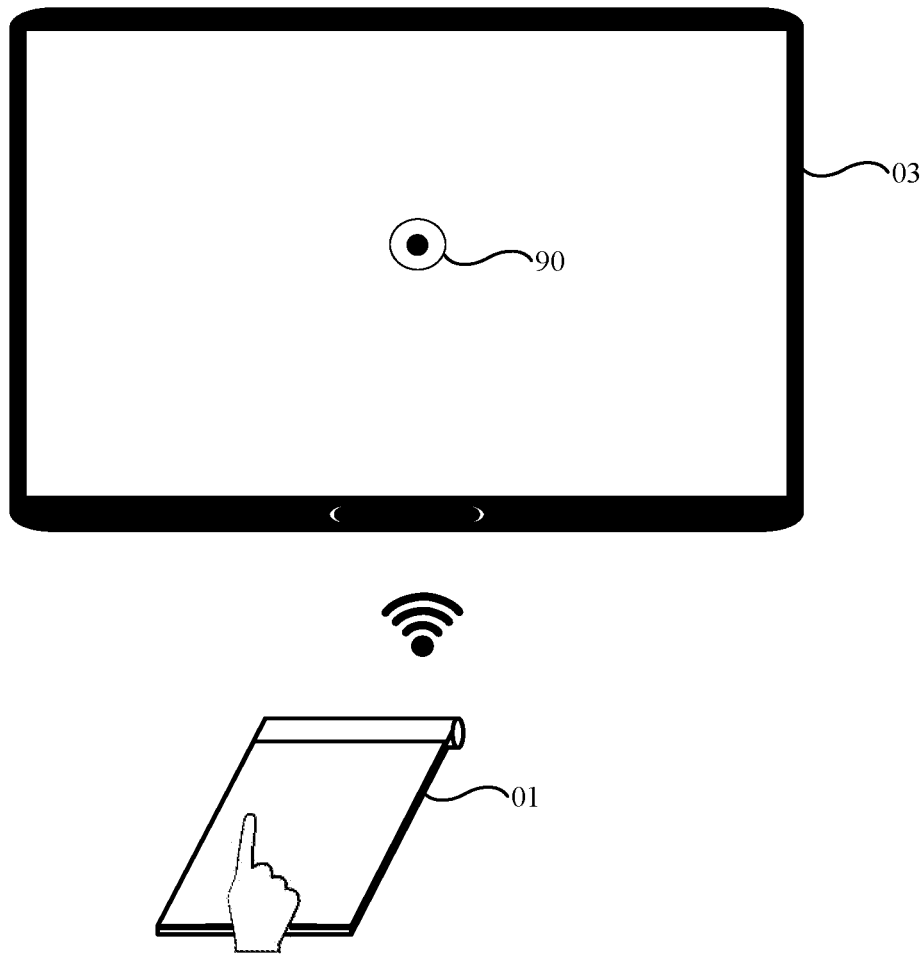
FIG. 17B is a schematic diagram of a touch control manner of a touch control system according to an embodiment of this application.

In this case, when a touch control system includes the electronic device 01 as the touchpad and a display terminal 03 shown in FIG. 17A, the electronic device may further include a first transmission element 81. The first transmission element 81 may be electrically connected to the second transmission element 82 of the display terminal 03 in a wired or wireless (as shown in FIG. 17B) manner. In this case, the processor 70 in the electronic device may calculate touch control coordinate data of the finger of the user based on the detection result of the touch control detection drive circuit 20, and transmit the touch control coordinate data to the second transmission element 82 by using the first transmission element 81. Then, a display end processor 83 parses the touch control coordinate data, and controls a second display screen 04 in the display terminal 03 to display a cursor 90 shown in FIG. 17B. In addition, a display end PMU in FIG. 17A is configured to supply power to the second display screen 04, the display end processor 83, and a memory. The memory is configured to store information output by the display end processor 83.

In this case, as shown in FIG. 17B, in a process in which a hand of the user operates the electronic device 01 (that is, the touchpad) in a floating touch manner, the user may obtain a touch control location of the finger in a displayed image on the display terminal 03 by staring at the display terminal 03 with two eyes. Therefore, a touch control operation can be implemented when there is a specific distance from a display terminal of a large screen.

Figure 18:
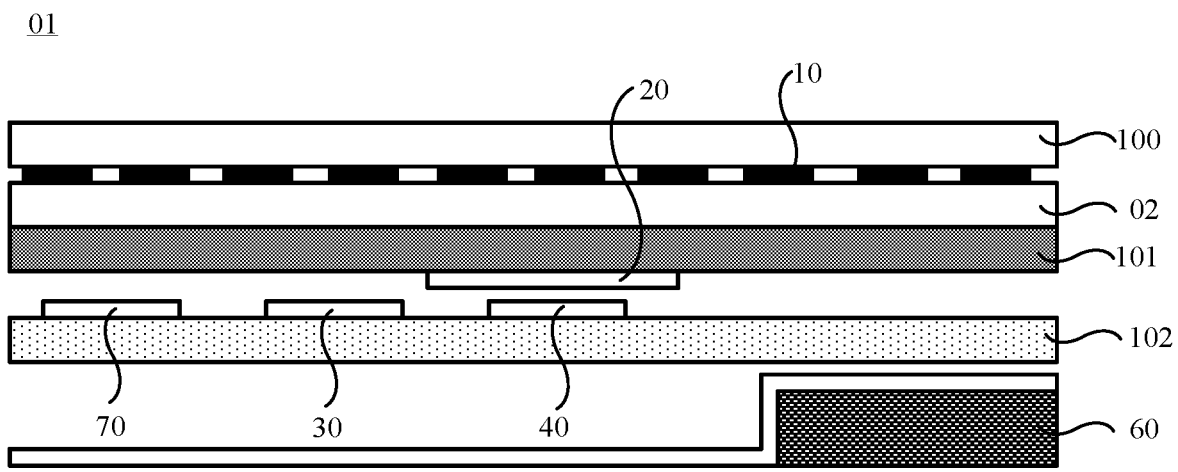
FIG. 18 is a schematic diagram of a cross-sectional structure of another electronic device according to an embodiment of this application.

Alternatively, in some other embodiments of this application, as shown in FIG. 18, when the electronic device 01 has a first display screen 02 configured to display an image, the touch control electrode 10 may be disposed between the first display screen 02 and the cover 100. The touch control electrode 10 may include the foregoing self-capacitance electrode. Alternatively, the touch control electrode 10 may include the transmitting electrode TX and the receiving electrode RX that are disposed in a stacked manner.

In this case, the electronic device 01 may include the first circuit board 101 and the second circuit board 102 that are disposed in a stacked manner. The second reference ground GND2 is disposed in the first circuit board 101, and the touch control detection drive circuit 20 may be disposed on a surface on a side that is of the first circuit board 101 and that is away from the cover 100. The first reference ground GND1 may be disposed in the second circuit board 102. Other control circuits in the electronic device 01 such as the processor 70, the isolation power supply circuit 30, the alternating-current amplifier circuit 40, the first isolation element 51, the second isolation element 52, and the first PMU 61 are disposed on the second circuit board 102. In this case, the electronic device 01 may be a mobile phone, an intelligent wearable product, or a tablet computer.

According to an embodiment of this application, a floating touch module is provided. The floating touch module is configured to: when there is a specific distance between a finger and a touch control electrode, detect a variation of a capacitance formed between the finger and the touch control electrode. The floating touch module may include a chip system. The chip system may be a structure obtained after a single bare chip is packaged. Alternatively, the chip system may be a structure formed after a plurality of bare chips are packaged.

The chip system may include a first reference ground GND1, a second reference ground GND2, a touch control detection drive module, an isolation power supply module, and an alternating-current amplifier module. When the chip system is a structure obtained after a single bare chip is packaged, the first reference ground GND1, the second reference ground GND2, the touch control detection drive module, the isolation power supply module, and the alternating-current amplifier module may be integrated into the same bare chip. Alternatively, when the chip system is a structure formed after a plurality of bare chips are packaged, the first reference ground GND1, the second reference ground GND2, the touch control detection drive module, the isolation power supply module, and the alternating-current amplifier module may be integrated inside the same chip package structure but in different bare chips.

The touch control detection drive module is electrically connected to the touch control electrode 10 and the second reference ground GND2. The touch control detection drive module is configured to input a touch control excitation signal S1 to the touch control electrode 10. A function of the touch control detection drive module may be implemented by using the touch control detection drive circuit 20.

The isolation power supply module is electrically connected to the touch control detection drive module, the first reference ground GND1, the second reference ground GND2, and the voltage source configured to provide the primary power supply voltage Vin. The isolation power supply module is configured to: insulate the first reference ground GND1 from the second reference ground GND2, insulate the voltage source from the touch control detection drive module, receive a primary power supply voltage Vin provided by the voltage source, convert the primary power supply voltage Vin into a drive voltage Vdr of the touch control detection drive module, and couple the drive voltage Vdr to the touch control detection drive module through energy coupling. A function of the isolation power supply module may be implemented by using the foregoing isolation power supply circuit 30.

The alternating-current amplifier module is electrically connected to the second reference ground GND2 and the first reference ground GND1. The alternating-current amplifier module is configured to: receive and amplify the touch control excitation signal S1 to generate a voltage regulation signal S2, and transmit the voltage regulation signal S2 to the second reference ground GND2. A function of the alternating-current amplifier module may be implemented by using the foregoing alternating-current amplifier circuit 40.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
   a touch control electrode;
   a first reference ground;
   a second reference ground;
   a touch control detection drive circuit, electrically connected to the touch control electrode and the second reference ground, wherein the touch control detection drive circuit is configured to provide a touch control excitation signal to the touch control electrode;
   an isolation power supply circuit, electrically connected to the touch control detection drive circuit, the first reference ground, the second reference ground, and a voltage source, wherein the isolation power supply circuit is configured to: insulate the first reference ground from the second reference ground, insulate the voltage source from the touch control detection drive circuit, receive a primary power supply voltage provided by the voltage source, convert the primary power supply voltage into a drive voltage of the touch control detection drive circuit, and couple the drive voltage to the touch control detection drive circuit through energy coupling; and
   an alternating-current amplifier circuit, electrically connected to the second reference ground and the first reference ground, wherein the alternating-current amplifier circuit is configured to: receive and amplify the touch control excitation signal to generate a voltage regulation signal, and transmit the voltage regulation signal to the second reference ground, wherein a peak-to-peak value of the voltage regulation signal is greater than a voltage value of the first reference ground.

2. The electronic device of claim 1, wherein the isolation power supply circuit comprises:
   a transformer, comprising a primary-side winding and a secondary-side winding;
   a resonant circuit, electrically connected to the primary-side winding, the first reference ground, and the voltage source, wherein the resonant circuit is configured to: convert the primary power supply voltage into an alternating current voltage, and transmit the alternating current voltage to the primary-side winding; and
   a rectifier circuit, electrically connected to the secondary-side winding, the second reference ground, and the touch control detection drive circuit, wherein the rectifier circuit is configured to convert an alternating current voltage generated through induction of the secondary-side winding into the drive voltage of the touch control detection drive circuit.

3. The electronic device of claim 1, wherein the isolation power supply circuit comprises:

a capacitor, comprising at least two plates, wherein one of the at least two plates is electrically connected to the first reference ground and the voltage source, and the other one of the at least two plates is electrically connected to the second reference ground and the touch control detection drive circuit.

4. The electronic device of claim 1, further comprising:
a first isolation element, coupled between the touch control detection drive circuit and the alternating-current amplifier circuit, wherein the first isolation element is configured to couple the touch control excitation signal to the alternating-current amplifier circuit.

5. The electronic device of claim 4, wherein the first isolation element comprises:
a light emitting device, electrically connected to the touch control detection drive circuit, wherein the light emitting device is configured to convert the touch control excitation signal from the touch control detection drive circuit into an optical signal; and
an optical-to-electrical converter, electrically connected to the alternating-current amplifier circuit, wherein the optical-to-electrical converter is configured to: convert the optical signal into an electrical signal, and transmit the electrical signal to the alternating-current amplifier circuit.

6. The electronic device of claim 4, wherein the first isolation element comprises:
a signal input interface, electrically connected to the touch control detection drive circuit, wherein the signal input interface is configured to receive the touch control excitation signal from the touch control detection drive circuit;
a signal output interface, electrically connected to the alternating-current amplifier circuit; and
an isolation capacitor, wherein a first end of the isolation capacitor is electrically connected to the signal input interface, and a second end of the isolation capacitor is electrically connected to the signal output interfaces, wherein the isolation capacitor is configured to transmit the touch control excitation signal from the signal input interface to the signal output interface.

7. The electronic device of claim 4, wherein the first isolation element comprises:
a sounding device, electrically connected to the touch control detection drive circuit, wherein the sounding device is configured to convert the touch control excitation signal from the touch control detection drive circuit into a sound signal; and
an electroacoustic transducer, electrically connected to the alternating-current amplifier circuit, wherein the electroacoustic transducer is configured to: convert the sound signal into an electrical signal, and transmit the electrical signal to the alternating-current amplifier circuit.

8. The electronic device of claim 1, wherein the alternating-current amplifier circuit comprises:
an operational amplifier, wherein an output end of the operational amplifier is electrically connected to the second reference ground, and a control end of the operational amplifier is electrically connected to a control voltage end;
a first capacitor, wherein a first end of the first capacitor is electrically connected to the touch control detection drive circuit, and a second end of the first capacitor is electrically connected to a positive input end of the operational amplifier;
a first resistor, wherein a first end of the first resistor is electrically connected to a negative input end of the operational amplifier;
a second capacitor, wherein a first end of the second capacitor is electrically connected to a second end of the first resistor, and a second end of the second capacitor is electrically connected to the first reference ground; and
a second resistor, wherein a first end of the second resistor is electrically connected to the negative input end of the operational amplifier, and a second end of the second resistor is electrically connected to the output end of the operational amplifier.

9. The electronic device of claim 6, wherein the alternating-current amplifier circuit further comprises:
a third resistor, wherein a first end of the third resistor is electrically connected to the control voltage end, and a second end of the third resistor is electrically connected to a positive input end of the operational amplifier; and
a fourth resistor, wherein a first end of the fourth resistor is electrically connected to the positive input end of the operational amplifier, a second end of the fourth resistor is electrically connected to the first reference ground;
wherein the third resistor and the fourth resistor have a same resistance value.

10. The electronic device of claim 1, further comprising:
a processor, electrically connected to the first reference ground; and
a second isolation element, coupled between the processor and the touch control detection drive circuit, wherein the second isolation element is configured to: couple a control signal output by the processor to the touch control detection drive circuit, and couple a touch control detection result obtained by the touch control detection drive circuit to the processor.

11. The electronic device of claim 1, further comprising:
a battery; and
a first power management unit (PMU), electrically connected to the battery and the isolation power supply circuit, wherein the first PMU is configured to convert a battery voltage of the battery into the primary power supply voltage.

12. The electronic device of claim 1, further comprising:
a first circuit board, wherein the second reference ground is disposed in the first circuit board, and the touch control detection drive circuit is disposed on the first circuit board; and
a second circuit board, wherein the first reference ground is disposed in the second circuit board, and the isolation power supply circuit and the alternating-current amplifier circuit are disposed on the second circuit board.

13. The electronic device of claim 1, further comprising:
a first circuit board, wherein the second reference ground is disposed in the first circuit board, and the touch control detection drive circuit and the isolation power supply circuit are disposed on the first circuit board; and
a second circuit board, wherein the first reference ground is disposed in the second circuit board, and the alternating-current amplifier circuit is disposed on the second circuit board.

14. The electronic device of claim 12, further comprising:
a cover;
wherein the touch control electrode is a self-capacitance electrode;

wherein the cover and the first circuit board are disposed in a stacked manner; and wherein the first circuit board comprises a first copper foil layer on a side facing towards the cover, the first copper foil comprises a plurality of self-capacitance electrodes, the self-capacitance electrode is connected to the cover, and the touch control detection drive circuit is disposed on a surface on a side that is of the first circuit board and that is facing away from the cover.

15. The electronic device of claim 12, further comprising:
a cover; and
a first display screen;
wherein the touch control electrode is a self-capacitance electrode;
wherein the self-capacitance electrode is located between the cover and an out-light surface of the first display screen; and
wherein a material of the touch control electrode comprises a transparent conductive material.

16. The electronic device of claim 14,
wherein the touch control detection drive circuit comprises a drive detection end, and the touch control electrode is electrically connected to the drive detection end; and
wherein the drive detection end is configured to: send the touch control excitation signal to the touch control electrode, and receive a detection signal of the touch control electrode.

17. The electronic device of claim 12, further comprising:
a plurality of touch control electrodes; and
a cover;
wherein the plurality of touch control electrodes comprise a plurality of transmitting electrodes and a plurality of receiving electrodes, and the plurality of transmitting electrodes and the plurality of receiving electrodes intersect and are insulated;
wherein the cover and the first circuit board are disposed in a stacked manner;
wherein the first circuit board comprises a first copper foil and a second copper foil that are stacked and insulated, wherein the first copper foil comprises the plurality of transmitting electrodes, the second copper foil comprises the plurality of receiving electrodes, and the transmitting electrode or the receiving electrode is connected to the cover; and
wherein the touch control detection drive circuit is disposed on a surface on a side that is of the first circuit board and that is facing away from the cover.

18. The electronic device of claim 12, further comprising:
a plurality of touch control electrodes;
a cover; and
a first display screen;
wherein the plurality of touch control electrodes comprise a plurality of transmitting electrodes and a plurality of receiving electrodes, and the plurality of transmitting electrodes and the plurality of receiving electrodes intersect and are insulated; and
wherein the plurality of transmitting electrodes and the plurality of receiving electrodes are located between the cover and an out-light surface of the first display screen.

19. A control method, comprising:
insulating, by an isolation power supply circuit of an electronic device, a first reference ground from a second reference ground, wherein the electronic device comprises: a plurality of touch control electrodes, a touch control detection drive circuit, the isolation power supply circuit, an alternating-current amplifier circuit, the first reference ground, and the second reference ground, wherein the touch control detection drive circuit is electrically connected to the touch control electrode and the second reference ground, wherein the isolation power supply circuit is electrically connected to the touch control detection drive circuit, the first reference ground, the second reference ground, and a voltage source, and wherein the alternating-current amplifier circuit is electrically connected to the second reference ground and the first reference ground;

insulating, by the isolation power supply circuit, the voltage source from the touch control detection drive circuit;

converting, by the isolation power supply circuit, a primary power supply voltage provided by the voltage source into a drive voltage of the touch control detection drive circuit, and coupling the drive voltage to the touch control detection drive circuit through energy coupling;

inputting, by the touch control detection drive circuit, a touch control excitation signal to the touch control electrode; and receiving and amplifying, by the alternating-current amplifier circuit, the touch control excitation signal to generate a voltage regulation signal, and transmitting the voltage regulation signal to the second reference ground, wherein a peak-to-peak value of the voltage regulation signal is greater than a voltage value of the first reference ground.

20. A chip system, comprising:
a first reference ground;
a second reference ground;
a touch control detection drive circuit, electrically connected to a touch control electrode and the second reference ground, wherein the touch control detection drive circuit is configured to provide a touch control excitation signal to the touch control electrode;
an isolation power supply circuit, electrically connected to the touch control detection drive circuit, the first reference ground, the second reference ground, and a voltage source, wherein the isolation power supply circuit is configured to: insulate the first reference ground from the second reference ground, insulate the voltage source from the touch control detection drive circuit, receive a primary power supply voltage provided by the voltage source, convert the primary power supply voltage into a drive voltage of the touch control detection drive circuit, and couple the drive voltage to the touch control detection drive circuit through energy coupling; and
an alternating-current amplifier circuit, electrically connected to the second reference ground and the first reference ground, wherein the alternating-current amplifier circuit is configured to: receive and amplify the touch control excitation signal to generate a voltage regulation signal, and transmit the voltage regulation signal to the second reference ground, wherein a peak-to-peak value of the voltage regulation signal is greater than a voltage value of the first reference ground.

* * * * *

UNITED STATES PATENT AND TRADEMARK OFFICE
CERTIFICATE OF CORRECTION

PATENT NO. : 11,977,700 B2
APPLICATION NO. : 18/247419
DATED : May 7, 2024
INVENTOR(S) : Zhengyuan Hu et al.

Page 1 of 1

It is certified that error appears in the above-identified patent and that said Letters Patent is hereby corrected as shown below:

In the Claims

Claim 6, Column 27, Line 39 reads as "electrically connected to the signal output interfaces," should read as -- electrically connected to the signal output interface, --

Signed and Sealed this
Twenty-second Day of April, 2025

Coke Morgan Stewart
*Acting Director of the United States Patent and Trademark Office*